US011785628B2

(12) United States Patent
Wieruch et al.

(10) Patent No.: US 11,785,628 B2
(45) Date of Patent: Oct. 10, 2023

(54) DEVICE AND METHOD FOR ASSOCIATING RESOURCE INFORMATION WITH CHANNEL METRIC INFORMATION IN WIRELESS NETWORKS

(71) Applicant: Fraunhofer-Gesellschaft zur Foerderung der angewandten Forschung e.V., Munich (DE)

(72) Inventors: Dennis Wieruch, Berlin (DE); Peter Jung, Berlin (DE); Bernd Holfeld, Berlin (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 0 days.

(21) Appl. No.: 16/838,777

(22) Filed: Apr. 2, 2020

(65) Prior Publication Data

US 2020/0236683 A1  Jul. 23, 2020

Related U.S. Application Data

(63) Continuation of application No. PCT/EP2018/076644, filed on Oct. 1, 2018.

(30) Foreign Application Priority Data

Oct. 6, 2017  (EP) .................................. 17195277

(51) Int. Cl.
*H04W 28/04* (2009.01)
*H04W 72/54* (2023.01)

(52) U.S. Cl.
CPC ........... *H04W 72/54* (2023.01); *H04W 28/04* (2013.01)

(58) Field of Classification Search
CPC . H04L 27/3488; H04L 5/0037; H04L 5/0053; H04L 25/03343; H04L 5/0051;
(Continued)

(56) References Cited

U.S. PATENT DOCUMENTS

2008/0232240 A1  9/2008  Baum et al.
2010/0189048 A1  7/2010  Baker et al.
(Continued)

FOREIGN PATENT DOCUMENTS

CN  101641885 A  2/2010
CN  102422584 A  4/2012
(Continued)

OTHER PUBLICATIONS

Diggavi, Suhas, et al., ""On Information Transmission over a Finite Buffer Channel"", IEEE Transactions on Information. Theory, (2006), vol. 52, No. 3, pp. 1226-1237, pp. 1226-1237.
(Continued)

*Primary Examiner* — David Q Nguyen
(74) *Attorney, Agent, or Firm* — Perkins Coie LLP; Michael A. Glenn

(57) ABSTRACT

A receiver configured for receiving a wireless signal having a signal transmitted through a channel using resource elements of a wireless communications network has a determiner configured for determining a resource information indicating the resource elements and for determining a channel metric of the channel. There receiver has an associator configured for associating the resource information with the channel metric using an identity information contained in the signal.

18 Claims, 18 Drawing Sheets

(58) Field of Classification Search
CPC ......... H04L 2025/03426; H04L 5/0007; H04L 5/0094; H04W 52/325; H04W 72/042; H04W 72/0446; H04W 72/1289; H04W 72/048; H04W 74/0816; H04W 74/004; H04W 72/14; H04W 52/245; H04W 24/10; H04W 8/005; H04W 72/1205; H04W 74/0808; H04W 52/0225; H04W 16/14; H04W 76/27; Y02D 30/70
USPC .................................. 370/328, 329, 330, 331
See application file for complete search history.

(56) References Cited

U.S. PATENT DOCUMENTS

| | | | |
|---|---|---|---|
| 2010/0279628 | A1 | 11/2010 | Love et al. |
| 2011/0249633 | A1* | 10/2011 | Hong .................... H04W 72/23 370/328 |
| 2014/0192730 | A1 | 7/2014 | Seo et al. |
| 2015/0189630 | A1 | 7/2015 | Aiba et al. |
| 2015/0304130 | A1 | 10/2015 | Logothetis et al. |
| 2016/0127094 | A1 | 5/2016 | Jiang et al. |
| 2016/0173249 | A1 | 6/2016 | Kwon et al. |
| 2016/0182199 | A1 | 6/2016 | Webb et al. |
| 2016/0270135 | A1 | 9/2016 | Lim et al. |
| 2017/0041948 | A1 | 2/2017 | Cheng et al. |
| 2017/0359807 | A1* | 12/2017 | Hong .................. H04W 72/042 |
| 2019/0342037 | A1* | 11/2019 | Karaki ................ H04W 72/04 |
| 2019/0364563 | A1* | 11/2019 | Jung .................... H04W 28/04 |
| 2020/0252255 | A1* | 8/2020 | Sorrentino ........... H04B 7/0456 |
| 2020/0259693 | A1* | 8/2020 | Baldemair ............ H04L 5/0048 |

FOREIGN PATENT DOCUMENTS

| | | |
|---|---|---|
| CN | 103797736 A | 5/2014 |
| CN | 103931261 A | 7/2014 |
| CN | 104509190 A | 4/2015 |
| CN | 105637793 A | 6/2016 |
| KR | 101237666 B1 * | 2/2013 |
| WO | 2013070138 A1 | 5/2013 |

OTHER PUBLICATIONS

Jaganathan, Kishore, et al., ""Phase Retrieval: An Overview of Recent Developments"", On Computing Research Repository (CoRR) atarXiv.org, Oct. 26, 2015, URL: https://arxiv.org/abs/1510.07713.

Kracht, David, et al., ""Insertion and deletion correcting DNA barcodes based on watermarks"", BMC Bioinformatics, (2015), vol. 16, No. 1, doi:10.1186/s12859-015-0482-7, Article No. 50, XP021220715.

Mercier, Hugues, et al., ""A survey of error-correcting codes for channels with symbol synchronization errors"", IEEE Communications Surveys and Tutorials, (2010), vol. 12, No. 1, doi:10.1109/SURV.2010.020110.00079, pp. 87-96, XP011289762, pp. 87-96.

Molisch, Andreas F, et al., ""Ultrawideband Propagation Channels-Theory, Measurement, and Modeling"", IEEE Transactions on Vehicular Technology, (2005), vol. 54, No. 5, pp. 1528-1545, 2005, pp. 1528-1545.

Walk, Philipp, et al., ""OFDM channel estimation via phase retrieval"", Proc. of 49th Asilomar Conference on Signals, Systems and Computers, (2015), doi:10.1109/ACSSC.2015.7421323, pp. 1161-1168, XP032874431, pp. 1161-1168.

Wieruch, Dennis, et al., ""Identifying Non-Adjacent Multiuser Allocations by Joint I1-Minimization"", Proc. of Wireless Communications and Networking Conference (WCNC, (20160400), doi:10.1109/WCNC.2016.7564854, pp. 1-6, XP032959195, pp. 1-6.

* cited by examiner

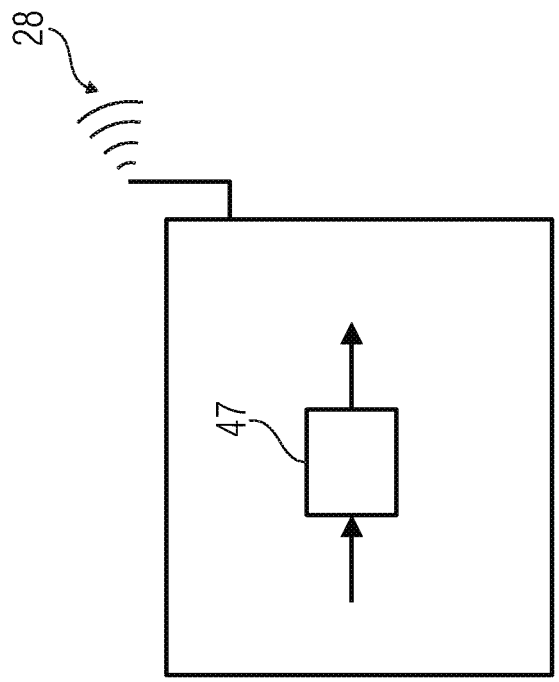

DEVICE AND METHOD FOR ASSOCIATING RESOURCE INFORMATION WITH CHANNEL METRIC INFORMATION IN WIRELESS NETWORKS

CROSS-REFERENCE TO RELATED APPLICATIONS

This application is a continuation of copending International Application No. PCT/EP2018/076644, filed Oct. 1, 2018, which is incorporated herein by reference in its entirety, and additionally claims priority from European Application No. 17195277.3, filed Oct. 6, 2017, which is also incorporated herein by reference in its entirety.

BACKGROUND OF THE INVENTION

The present invention relates to a receiver, to a transmitter, to a wireless communication network having at least one transmitter and at least one receiver, two methods for operating the same and to a computer program. The present invention further relates to a grant-free access, e.g., in wireless communication networks.

One of the main challenges in wireless communication is the increase of spectral efficiency. A way to achieve better spectral efficiency is by reducing the communication overhead. Especially for forthcoming network types like Device-to-Device (D2D) communication overhead reduction will be beneficial. This includes radio resource management exchanging the resource map as well as the exchange of channel quality measurement and pilots for channel estimation. Another challenge lies in low latency communication. Scheduling entails initial communication procedures, which introduces latency to the wireless transmission. Especially for non-deterministic traffic, where the data rate or the time of transmission is not known in advance, scheduling leads to a constant offset on latency. Contention-based schemes like listen-before-talk offer the medium access without scheduling. For single device scenarios an instant medium access on the desired band is easily achieved. However, the listen-before-talk scheme is not scalable. The larger the number of devices or device activity in a scenario, the higher the probability that the desired band is occupied and the device has to wait non-deterministic time until the desired transmission band is available. A third challenge lies in the design of low complexity and low energy devices. Especially for transmitters with reduced or no receiver capabilities medium access without prior control messages is needed.

In wireless communications, to transmit a message from a source device over a wireless channel to a sink device, the utilized transmission resource has to be known to both devices. In this way, source and sink of the message are implicitly determined by the transmission resources. However, in the case where only subsets of the known transmission resources are intended for the sink, an identifier encodes the recipient of each subset. In the cellular context, the first case applies for uplink as well for device-to-device transmission and the latter case for downlink transmission. In the context of IEEE 802.11 WLAN and derivatives the latter case applies.

Two major concepts are used to determine the (subset of) transmission resources:

Contention-free access: scheduling of resources by e.g. a central coordinator (including token passing and polling mechanisms)

Contention-based access: ALOHA protocol and advancements like listen-be-fore-talk occupying the complete transmission band.

Both cases introduce latency to the communication process, at least for the initial transmission. In the first case, the scheduling decision has to be communicated between the coordinator and the devices, which results in a constant offset to the latency. However, in the second case, the device has to wait until the transmission band is free for communication. Thus, the communication delay is not deterministic and strict latency requirements cannot be achieved.

A common legacy communication system with baseband and analog unit is described in [1] for LTE (Long Term Evolution), where the resource allocation is performed by the base station as a central coordinator.

Thus, there is a need to provide for a concept that allows efficient communication enabling medium access without a need for prior control messages.

SUMMARY

According to an embodiment, a receiver configured for receiving a wireless signal having a signal transmitted through a channel using resource elements of a wireless communications network may have: a determiner configured for determining a resource information indicating the resource elements and for determining a channel metric of the channel; and an associator configured for associating the resource information with the channel metric using an identity information contained in the signal.

According to another embodiment, a transmitter configured for wirelessly transmitting to a receiver a signal using resource elements of a wireless communications network may have: a resource selector for selecting the resource elements from a plurality of resource elements in the wireless communications network, wherein the selecting is at least partially unknown at the receiver.

Another embodiment may have a transmitter configured for wirelessly transmitting to a receiver a signal using resource elements of a wireless communications network; wherein the transmitter is configured for using a core set for transmitting a first signal during a first time instance; wherein the transmitter is configured for using at least one additional resource from a pool of additional resources in addition to the core set for transmitting a second signal during a second instance of time without signaling the use of additional resources.

According to still another embodiment, a wireless communications network providing a plurality of resource elements for transmitting signals may have: an inventive receiver as mentioned above; and at least a first inventive transmitter as mentioned above.

According to another embodiment, a method for receiving a wireless signal having a signal transmitted through a channel using resource elements of a wireless communications network may have the steps of: determining a resource information indicating the resource elements; determining a channel metric of the channel; and associating the resource information with the channel metric using an identity information contained in the signal.

According to another embodiment, a method for wirelessly transmitting a signal using resource elements of a wireless communications network may have the step of: selecting, at the transmitter, the resource elements from a plurality of resource elements in the wireless communications network such that the selecting is at least partially unknown at a receiver of the signal.

Still another embodiment may have a non-transitory digital storage medium having stored thereon a computer program for performing a method for receiving a wireless signal having a signal transmitted through a channel using resource elements of a wireless communications network having the steps of: determining a resource information indicating the resource elements; determining a channel metric of the channel; and associating the resource information with the channel metric using an identity information contained in the signal, or a method for wirelessly transmitting a signal using resource elements of a wireless communications network having the step of: selecting, at the transmitter, the resource elements from a plurality of resource elements in the wireless communications network such that the selecting is at least partially unknown at a receiver of the signal, when said computer program is run by a computer.

The inventors have found that resources used for a communication channel may be associated with respective communication node having performed said communication, and that a determination/association thereof with the transmitter may be performed at the receiver. This allows for determining communication properties at the receiver so as to avoid signaling for scheduling communication resources and therefore allows for efficient communication without a need for dedicated control messaged. The concept is even capable of handling collisions, such that delays due to listening in a listen-before-talk scheme may also be avoided. By avoiding times for transmitting schedules and/or listenings, a low latency communication may be performed.

According to an embodiment, a receiver is configured for receiving a wireless signal, comprising at least one signal to be transmitted through a channel using the resource elements of a wireless communications network. The receiver comprises a determiner configured for determining a resource information indicating the resource elements used for transmitting the signal and for determining a channel metric of the channel used for transmission. The receiver comprises an associator configured for associating the resource information with the channel metric using an identity information contained in the signal. This allows for ascribing or allocating the resource elements used for transmitting the signal to the respective transmitter transmitting the signal so as to determine the transmission system and to set up a proper communication between the receiver and the transmitter. This may be done by using the signal received.

According to an embodiment, the wireless signal is a superposition of at least the signal being a first signal transmitted through the channel being a first channel using the resource elements of the wireless communication network as first resource elements and of a second signal transmitted through a second signal using second resource elements of the wireless communications network. The determiner is configured for determining the resource information as a first resource information and for determining a second resource information indicating the second resource elements and for determining the channel metric of the first channel as first metric and for determining a second channel metric of the second channel. The associator is configured for associating the first resource information with the first channel metric using the identity information as first identify information contained in the first signal and for associating the second resource information with the second channel metric using second identity information contained in the second signal. Thus, although being received as a super positioned signal, the receiver is configured for associating information relating to the first resource elements, the first channel metric and the first identity information so as to separate the communication for the first signal from the communication for the second signal which allows the receiver to perform communication to both, a first node having transmitted the first signal and a second node having transmitted the second signal without having prior knowledge due to a scheduling mechanism or without having the requirement for awaiting a silent channel at the transmitter. According to an embodiment the identity information comprises one of an identifier being a part of information transmitted in the signal, an identifier being indicated by a selection of the resource elements out of an overall set of resource elements and an identifier being indicated by the channel metric. This allows for logically separating users at the receiver side.

According to an embodiment, the receiver comprises a channel determiner configured for determining information related to a phase change and of an amplitude change of a first channel to a first signal and of a second channel to a second signal superimposing with the first signal in the wireless signal, wherein the receiver is configured to use the information related to the phase change and of the amplitude change for decoding the wireless signal.

According to an embodiment, the determiner is configured for determining the resource information and the channel metric based on the determination rule $$(S, x) = \underset{S,x}{\operatorname{argmin}} \|x\|_{l_1} \quad (2.1)$$

such that $$\|(S \cdot \Phi_K \cdot x) - y\|_{l_2}^2 \leq \sigma^2 \quad (2.2)$$

wherein S is a resource map of all K transmitters, the resource map containing the resource information of all K transmitters. This allows for using signals having pilot symbols and mere amplitude symbols and to decode the signals, e.g., a phase retrieval technique may be used for decoding.

According to an embodiment, the determiner is configured for determining the resource information as a plurality of resource values, e.g., in vector form or matrix form, and to determine each of the plurality of resource values so as to comprise one of at least three values. I.e., the resource values may be multi-valued. This allows to encode further information in the resource information beyond the information if a resource element is used or not, for example, a number of transmitters using the respective resource information.

According to an embodiment, the wireless signal is a superposition of at least the signal being a first signal and of a second signal transmitted through a second channel using second resource elements. The determiner is configured for determining the resource information as a first resource information and for determining a second resource information relating to the second resource elements based on a predetermined rule according to which pilot symbols and data symbols are mapped in the resources used by the first and the second signal by separating the first signal from the second signal using information related to the predetermined rule. I.e., the receiver may be configured for distinguishing between the resources used for transmitting the first signal and resources being used for transmitting the second signal using information that each indicates a set of resource elements being used together for transmission. This allows to enhance separation of the different transmitters.

According to an embodiment, the determiner is configured for determining the channel metric based on a predetermined rule according to which pilot symbols are mapped in the resources used by the signal using the pilot symbols contained in the wireless signal. This may allow to identify a user and/or separate them at the receiver in addition or as a substitute for using a predetermined rule according to which resource elements are located in a resource map.

According to an embodiment, the signal is a first signal of a plurality of signals in the wireless signal. The determiner is configured for determining a resource information for each signal contained in the wireless signal so as to obtain an overall resource information, e.g., a common resource map. The determiner is configured for determining a channel metric for each channel associated to a signal in the wireless signals so as to obtain an overall channel metric. The overall channel metric may in combination with the resource information allow for using legacy error correction based on a memoryless channel model. However, it may be optimal to use error correction based on a insertion/deletion/substitution channel model. If only partial information of the overall resource information is present, e.g., the resource information of the first signal, and the corresponding channel metric, then the error correction is based on the insertion/deletion/substitution channel model.

According to an embodiment, the receiver comprises an error corrector configured for correcting at least one bit error in the first signal using the resource information determined for the respective signal in the wireless signal. This may allow for enhancing communication by correcting errors.

According to an embodiment, the determiner is configured for obtaining correction information indicating a result of the error correction and for adjusting a determination of the resource information dependent on the correction information. For example, a concept according to a turbo receiver, may be used by providing for a feedback from the error corrector to the determiner. This may allow for high quality error correction.

According to an embodiment, resources, sets of thereof respectively, may be distributed in an exclusive way (no or a low amount or overlap) or may be distributed in a non-exclusive way, i.e., overlap is allowed. The first may allow for enhancing separation of different signals, wherein the latter may allow for enhancing spectral efficiency.

According to an embodiment, the determiner is configured for determining a resource information for each signal contained in the wireless signal. The receiver comprises a decoder configured for decoding a first signal so as to obtain a first message transmitted with the first signal and for decoding a second signal so as to obtain a second message transmitted with the second signal. The receiver comprises a channel determiner configured for determining information related to phase change and of an amplitude change of the channel to the first signal and to the second signal. The receiver comprises an error corrector configured for correcting at least one bit error in the first signal using the resource information determined for the first signal or in the second signal using the resource information determined for the second signal. This may allow for low latency communication supporting grant-free access at the transmitter side.

According to an embodiment, resource elements used for transmitting the signal are distributed in the resource map. This may be obtained by using blocks of resource elements, each block having a set of adjacent resource elements, e.g., 6, 12, or the like, wherein the blocks are distributed in the resource map. Alternatively, each block may comprise distributed resource elements. Distributing resource elements in the resource map may allow for a precise determination of channel metrics due to the distribution of the signal over a plurality of resource limits being modified differently within a common channel.

According to an embodiment, a transmitter is configured for wirelessly transmitting a signal using resource elements of a wireless communications network. The transmitter comprises a resource selector for selecting the resource elements from a plurality of resource elements in the wireless communications network. The selecting is at least partially unknown at the receiver of the signal. Thus, the receiver may decide on its own, whilst not excluding considering boundary conditions, which resource elements to be used, for example, based on a self-determined channel metric. Based on the selection being at least partially unknown to the receiver, overhead due to signaling may be avoided. The selection being at least partial unknown may refer to a partial knowledge in terms of boundary conditions, for example, to information which carriers or subbands have to remain unused or the like.

According to an embodiment, the transmitter is configured for determining a resource element to be used for transmission of the signal and for mapping at least one pilot symbol and at least one data symbol according to a predetermined rule to the resource element. By using the predetermined rule, additional information may be transmitted to the receiver, allowing the receiver to identify the transmitter.

According to an embodiment, the resource selector is configured for selecting at least one of a plurality of predefined sets of resources for transmitting the signal. By using one of the predefined sets or at least two of the predefined sets, identity information may be transmitted.

According to an embodiment, the resource selector is configured for selecting the at least one set from the plurality of predefined sets using a selection information indicating a subset of the plurality of predefined sets, wherein the transmitter is configured for selecting the set from the subset of predefined sets. Such sets may either be exclusive sets or overlapping sets and may allow for implementing an identity information.

According to an embodiment, the transmitter is configured for temporarily using at least one additional resource from a pool of additional resources in addition to the set of resources for transmitting the signal. The set of resources may be a core set. Temporarily, for example, when needing a higher throughput, the transmitter may use additional resources. The additional resources may be associated with the respective core set such that when using such additional resources, the identity information may be maintained. If other identity information is transmitted such an association may also be substituted.

According to an embodiment, the transmitter is configured for temporarily using a plurality of additional resources up to a predefined maximum data rate indicated by a maximum data rate information. This may allow to avoid excessive use of resources by a single transmitter. Additional resources may be selected individually or by selecting at least one additional set of the predefined sets for transmitting the signal. This may allow increasing or decreasing the bandwidth block-wise. According to an embodiment, the transmitter is configured for using a channel metric indicating a channel characteristic of at least a part of a channel from the transmitter to a receiver. The channel metric may comprise a channel gain, a phase and amplitude of the channel and/or other characteristics. The resource selector is configured for selecting the set from the plurality of predefined sets dependent on the channel characteristic. For example, a channel comprising a low attenuation through the channel may be selected. Alternatively, or in addition, a set comprising low interference to other receivers may be selected.

According to an embodiment, a transmitter is configured for wirelessly transmitting a signal to a receiver and for using resource elements of a wireless communications network for said transmission. The transmitter is configured for using a core set of resource elements for transmitting a first signal during a first time instance. The transmitter is configured for using at least one additional resource from a pool of additional resources in addition to the core set for transmitting a second signal during a second instance of time without signaling the use of additional resources. This allows for dynamically adapt transmission rates whilst avoiding signaling overhead.

According to an embodiment, a wireless communications network providing a plurality of resource elements for transmitting signals comprises a receiver according to an embodiment and at least a first transmitter according to an embodiment.

According to an embodiment, the wireless network comprises at least a first and a second transmitter. The first and the second transmitter are configured to use predefined resources for transmitting the first and second signal, wherein the predefined resources are predefined so as to indicate non-overlapping resources, i.e., at least a part of the used resources do not overlap.

According to an embodiment, the at least first transmitter is configured for selecting at least a first set from a plurality of predefined sets of resources for transmitting the first signal. The at least first transmitter is configured for selecting the first set of resources from the plurality of predefined sets using a first selection information indicating a first subset of the plurality of predefined subsets. This allows reducing the search space at the receiver, because only sets of the predefined sets may be used. This may thus allow for increasing efficiency of the wireless network.

According to an embodiment, the first transmitter is configured for selecting at least a first set from a plurality of predefined sets of resources for transmitting the first signal. A second transmitter of the wireless network is configured for selecting at least a second set from the plurality of predefined sets of resources for transmitting a second signal. The first transmitter is configured for using a first channel metric indicating a first channel characteristic of at least a part of a first channel from the first transmitter to the receiver for selecting the at least first set dependent on the first channel characteristic. The second transmitter is configured for using a second channel metric indicating a second channel characteristic of at least a part of a second channel from the second transmitter to the receiver for selecting the at least second set dependent on the second channel characteristic. Thus, the first and second transmitter may select their used resources dependent on the channel being present between the respective transmitter and the receiver. Therefore, an overall-enhancement of communication may be obtained.

According to an embodiment, the first and second transmitter are configured for selecting the same resources for transmission of the first and second signal, wherein the first and second transmitter are configured for applying a Non-Orthogonal Multiple Access Scheme for transmission of the first and second signal. This may allow for a high resource efficiency.

According to an embodiment, the network is configured for operating according to a multicarrier concept comprising a plurality of carriers.

According to an embodiment, a method for receiving a wireless signal comprising a signal transmitted through a channel using resource elements of a wireless communications network comprises determining a resource information indicating the resource elements, determining a channel metric of the channel and associating the resource information with the channel metric using an identity information contained in the signal.

According to an embodiment, a method for wirelessly transmitting a signal using resource elements of a wireless communications network comprises selecting, at a transmitter, the resource elements from a plurality of resource elements in the wireless communications network such that the selecting is at least partially unknown at a receiver of the signal.

Further embodiments refer to a non-transitory storage medium having stored there on a computer program having a program code for performing, when running on a computer, a method according to embodiments. Further embodiments refer to such a computer program.

BRIEF DESCRIPTION OF THE DRAWINGS

Embodiments of the present invention will be detailed subsequently referring to the appended drawings, in which:

FIG. 13 shows a schematic block diagram of a transmitter according to an embodiment;

DETAILED DESCRIPTION OF THE INVENTION

Figure 1:
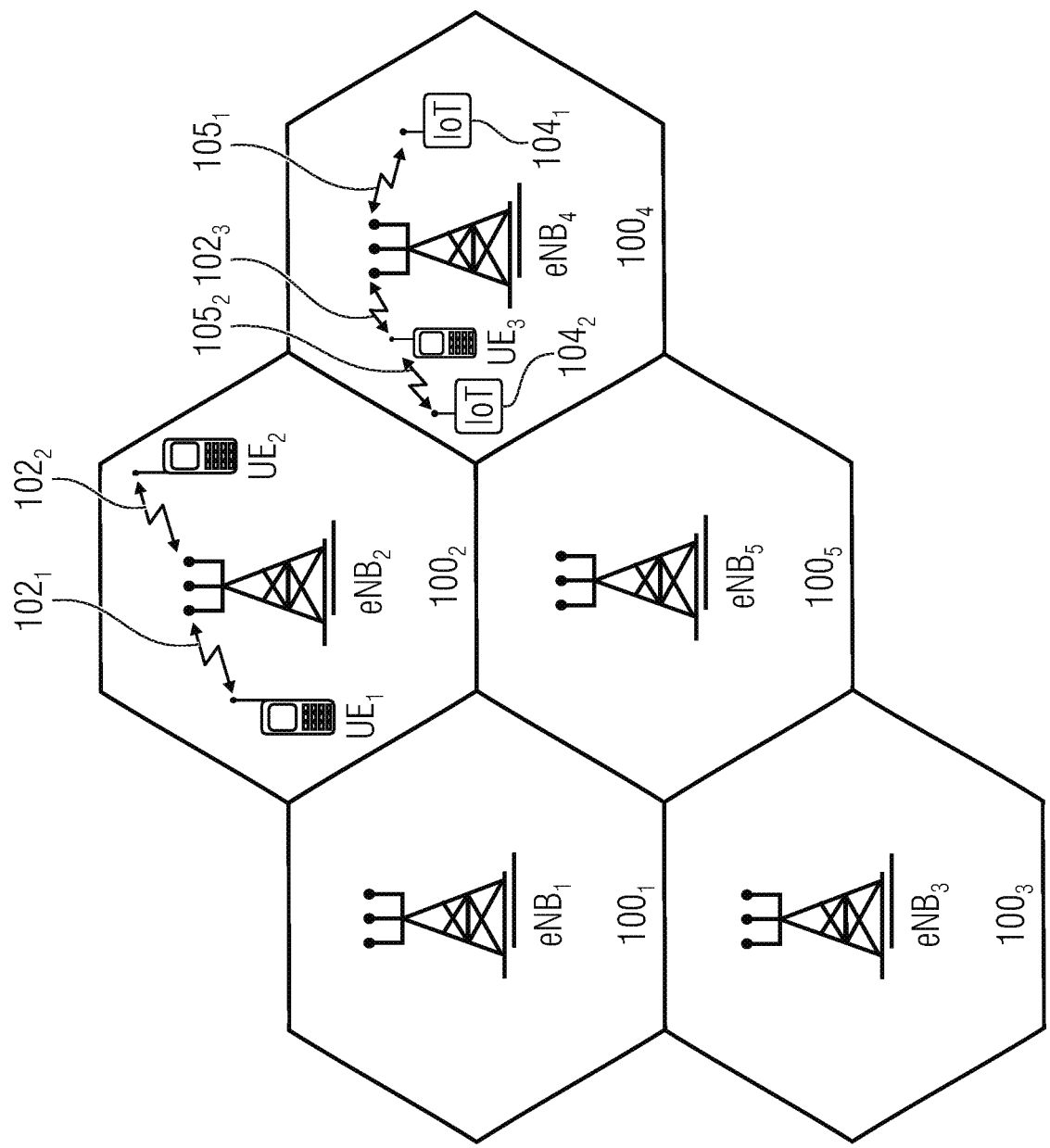
FIG. 1 shows a schematic representation of an example network infrastructure according to an embodiment.

Equal or equivalent elements or elements with equal or equivalent functionality are denoted in the following description by equal or equivalent reference numerals even if occurring in different figures.

In the following description, a plurality of details is set forth to provide a more thorough explanation of embodiments of the present invention. However, it will be apparent to those skilled in the art that embodiments of the present invention may be practiced without these specific details. In other instances, well known structures and devices are shown in block diagram form rather than in detail in order to avoid obscuring embodiments of the present invention. In addition, features of the different embodiments described hereinafter may be combined with each other, unless specifically noted otherwise.

Identity information may comprise information that allows for identifying the transmitter, i.e., in terms of a medium access control (MAC) identifier or the like but is not restricted hereto. Each information allowing to discriminate the transmitter from a different transmitter may be suitable as identity information. By non-limiting example, this may also include a respective channel metric. Especially for stationary transmitters, the channel metric may face a slow alteration or may even remain constant. Therefore, the channel metric may also be suitable to discriminate between the transmitter having this channel metric and another transmitter having a different channel metric.

FIG. 1 is a schematic representation of an example of such a network infrastructure, like a wireless communications system including a plurality of base stations $eNB_1$ to $eNB_5$, each serving a specific area surrounding the base station schematically represented by the respective cells $100_1$ to $100_5$. The base stations are provided to serve users within a cell. A user may be a stationary device or a mobile device. Further, the wireless communication system may be accessed by IoT devices which connect to a base station or to a user. FIG. 1 shows an exemplary view of only five cells, however, the wireless communication system may include more such cells. FIG. 1 shows two users $UE_1$ and $UE_2$, also referred to as user equipment (UE), that are in cell $100_2$ and that are served by base station $eNB_2$. Another user $UE_3$ is shown in cell $100_4$ which is served by base station $eNB_4$. The arrows $100_2$, $102_2$ and $102_3$ schematically represent uplink/downlink connections for transmitting data from a user $UE_1$, $UE_2$ and $UE_3$ to the base stations $eNB_2$, $eNB_4$ or for transmitting data from the base stations $eNB_2$, $eNB_4$ to the users $UE_1$, $UE_2$, $UE_3$. Further, FIG. 1 shows two IoT devices $104_1$ and $104_2$ in cell $100_4$, which may be stationary or mobile devices. The IoT device $104_1$ accesses the wireless communication system via the base station $eNB_4$ to receive and transmit data as schematically represented by arrow $105_1$. The IoT device $104_2$ accesses the wireless communication system via the user $UE_3$ as is schematically represented by arrow $105_2$. $UE_1$, $UE_2$ and $UE_3$ may access the wireless communications system or network by communicating with the base station. The arrow $105_2$ may also indicate a device-to-device (D2D) communication in which devices such as IoT device $104_2$ and $UE_3$ communicate directly with each other. Such communication may be scheduled by the $eNB_4$, e.g., when determining which resources are to be used for such communication, but may also be scheduled autonomously, e.g., when $eNB_4$ is out of range.

The wireless communications network system may be any single-tone or multicarrier system based on frequency-division multiplexing, like the orthogonal frequency-division multiplexing (OFDM) system, the orthogonal frequency-division multiple access (OFDMA) system defined by the LTE standard, or any other IFFT-based signal with or without CP, e.g. DFT-SOFDM. Other waveforms, like non-orthogonal waveforms for multiple access, e.g. filterbank multicarrier (FBMC), may be used. Other multiplexing schemes like time-division multiplexing (time-division duplex—TDD) may be used.

An OFDMA system for data transmission may include an OFDMA-based physical resource grid which comprises plurality of physical resource blocks (PRBs) each defined by 12 subcarriers by 7 OFDM symbols and including a set of resource elements to which various physical channels and physical signals are mapped. A resource element is made up of one symbol in the time domain and one subcarrier in the frequency domain. For example, in accordance with the LTE standard a system bandwidth of 1.4 MHz includes 6 PRBs, and the 200 kHz bandwidth in accordance with the NB-IoT enhancement of the LTE Rel. 13 standard includes 1 PRB. In accordance with LTE and NB-IoT, the physical channels may include the physical downlink shared channel (PDSCH) including user specific data, also referred to as downlink payload data, the physical broadcast channel (PBCH) including for example the master information block (MIS) or the system information block (SIB), the physical downlink control channel (PDCCH) including for example the downlink control information (DCI), etc. The physical signals may comprise reference signals (RS), synchronization signals and the like. The LTE resource grid comprises a 10 ms frame in the time domain having a certain bandwidth in the frequency domain, e.g. 1.4 MHz. The frame has 10 sub-frames of 1 ms length, and each subframe includes two slots of 6 or 7 OFDM symbols depending on the cyclic prefix (CP) length.

Figure 2:
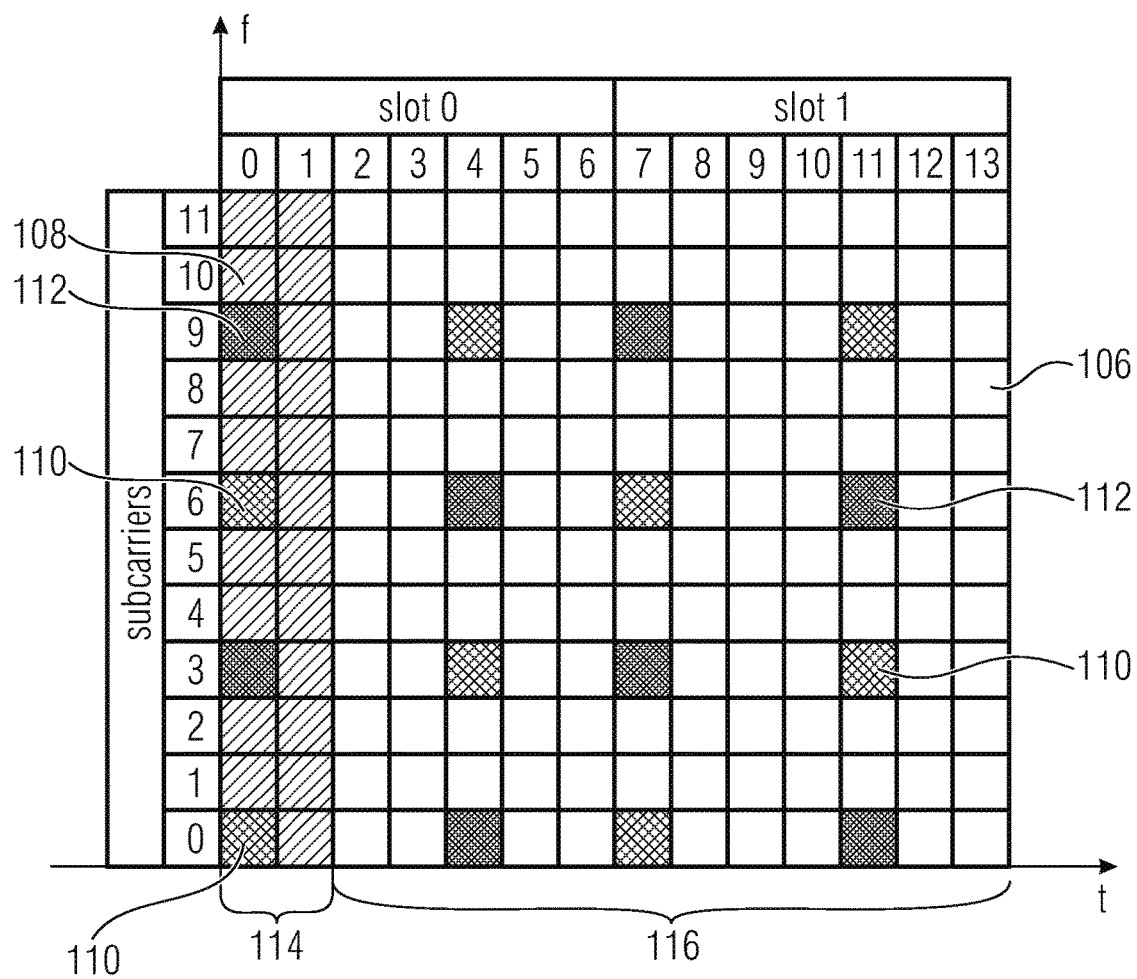
FIG. 2 shows an exemplary LTE OFDMA-based subframe with two antenna ports for different selected Tx antenna ports according to an embodiment.

FIG. 2 shows an exemplary LTE OFDMA-based subframe with, for example, two antenna ports for possibly different selected Tx antenna ports. The subframe includes two resource blocks (RB) each made up of one slot of the subframe and 12 subcarriers in the frequency domain. The subcarriers in the frequency domain are shown as subcarrier 0 to subcarrier 11, and in the time domain, each slot includes 7 OFDM symbols, e.g. in the slot 0 OFDM symbols 0 to 6 and in slot 1 OFDM symbols 7 to 13. The white boxes 106 represent resource elements allocated to the PDSCH including the payload or user data, also referred to a payload region. The resource elements for the physical control channels (including non-payload or non-user data), also referred to the control region, are represented by the hatched boxes 103. In accordance with examples, resource elements 103 may be allocated to the PDCCH, to the physical control format indicator channel (PCFICH), and to the physical hybrid ARQ indicator channel (PHICH). The cross-hatched boxes 107 represent resource elements which are allocated to the RS that may be used for the channel estimation. The black boxes 108 represent unused resources in the current antenna port that may correspond to RSs in another antenna port. The resource elements 103, 107, 108 allocated to the physical control channels and to the physical reference signals are not evenly distributed over time. More specifically, in slot 0 of the subframe the resource elements associated with the symbol 0 and the symbol 1 are allocated to the physical control channels or to the physical reference signals, no resource elements in the symbols 0 and 1 are allocated to payload data. The resource elements associated with symbol 4 in slot 0 as well as the resource elements associated with symbols 7 and 11 in slot 1 of the subframe are allocated in part to the physical control channels or to the physical reference signals. The white resource elements shown in FIG. 2 may include symbols associated with payload data or user data and in the slot 0 for symbols 2, 3, 5 and 6, all resource elements 106 may be allocated to payload data, while less resource elements 106 are allocated to payload data in symbol 4 of slot 0, and no resource element is allocated to payload data in symbols 0 and 1. In slot 1, the resource elements associated with symbols 8, 9, 10, 12 and 13 are all allocated to payload data, while for symbols 7 and 11 less resource elements are allocated to payload data.

Resource elements 106 of the PDSCH slots may be used by a number of nodes for downlink purpose. Similarly, there may be resource elements that may be used for uplink purposes. According to embodiments, there may exist situations, where transmitters that are not allocated with resources and therefore unable to transmit user data to a (common) receiver such as a base station. Such transmitters are allowed to use such resource elements for uplink purposes without prior scheduling. Such a concept may also be referred to as grant-free. Embodiments described herein relate to such a scenario in which transmitters implement a grant-free access.

Figure 3A:
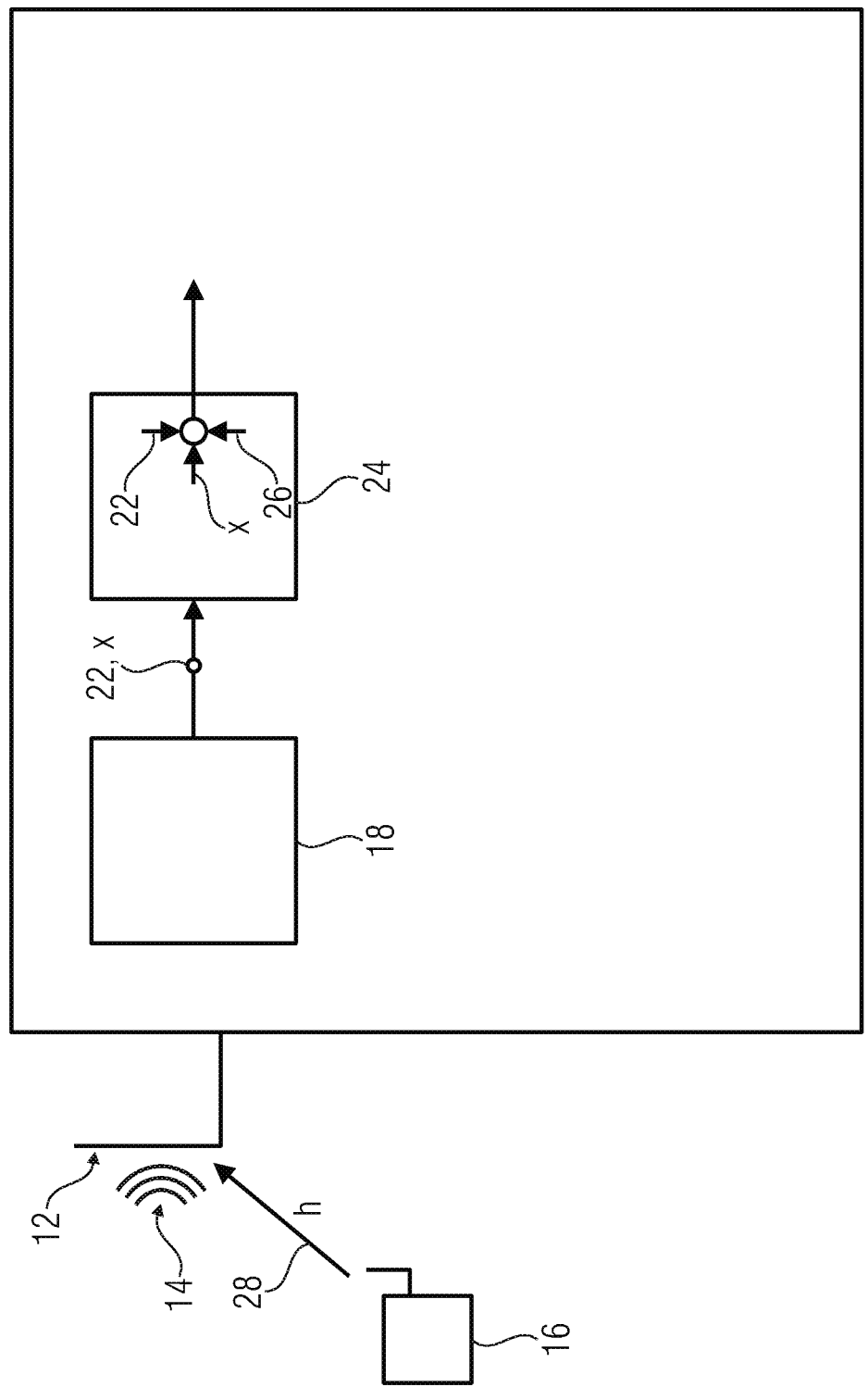
FIG. 3a shows a schematic block diagram of a receiver according to an embodiment.

FIG. 3a shows a schematic block diagram of a receiver 30 according to an embodiment. The receiver 30 may be used, for example, as one of the base stations $eNB_1$ to $eNB_5$ illustrated in FIG. 1 but may also implement a user equipment (UE) of FIG. 1. The receiver 30 comprises an antenna 12 for receiving a wireless signal 14. The antenna array 12 may be a single antenna element or may be an antenna array which may allow for implementing techniques such as beam forming or the like. The wireless signal 14 may be transmitted or received from a transmitter 16. Between the transmitter 16 and the receiver 30 there is present a physical media leading to an alteration or manipulation of the signal transmitted at the transmitter 16. This alteration may be referred to as the wireless signal 14 being transmitted through a channel. The channel may be represented by a channel metric. The channel metric may be expressed, for example, as a channel impulse response and/or a cyclic autocorrelation of the channel impulse response. The channel impulse response may be obtained directly by the resource determiner 42, for example, when pilots are transmitted and received or by channel estimation via a phase retrieval technique, for example, when a mere amplitude signal is present. The cyclic autocorrelation of the channel impulse response may be obtained, for example, from a above resource map estimation as described herein, e.g., if only amplitude knowledge is available. The channel metric may be represented hereinafter as a channel matrix H which shall not exclude other embodiments. The channel metric may thus describe the alteration of the wireless signal 14 when traveling from the transmitter 16 to the receiver 30. For transmitting the wireless signal 14 resources may be occupied or used. With reference to FIG. 2, such resources may be referred to as a portion or part in the time domain, the frequency domain, the code domain and/or the spatial domain. By non-limiting example only, transmission of a symbol in an OFDM (Orthogonal Frequency Division Multiplex) may occupy or use a resource element being at least partially defined as a time/frequency element. The receiver 30 comprises a determiner 18 configured for determining a resource information 22 indicating the resource elements used for transmitting the wireless signal 14. The determiner 22 is further configured for determining a channel metric x of the channel, the channel metric x describing at least partially the alteration indicated as H.

The receiver 30 further comprises an associator 24 configured for associating the resource information 22 with the channel metric x using an identity information 26 contained in the signal 28 of the wireless signal 14. The identity information may be, for example, an identifier being part of information transmitted in the signal 28, an identifier being indicated by a selection of the resource elements out of an overall set of resource elements and/or an identifier being indicated by the channel metric x. The identity information being information transmitted in the signal may be obtained, for example, by decoding the signal or the message transmitted therewith so as to obtain a respective information. This may be, for example, a transmitter ID, a location information or any suitable information for identifying the transmitter 16. In this connection, identifying does not necessarily require a unique identification as it may be obtained, for example, when using a MAC address. It may be sufficient to distinguish between all transmitters that transmit signals, wherein two or more signals may superimpose to the wireless signal 14. i.e., in case of only one transmitter 16, the identity information may be any information that indicates a transmitter, for example, occupying the channel when transmitting the signal 28. Such information may also be obtained by indicating the own identity by a selection of resource elements. The selection of resource elements may be done by the transmitter according to a specific pattern, wherein the transmitter may identify itself at least when compared to other transmitters, by the respective pattern of the selection. Alternatively or in addition, the identity information may be indicated by the channel metric x. For example, a stationary or slowly moving transmitter may face a channel metric which varies slowly over time or is even constant. Therefore, the channel metric being different from the channel metric of others or the behavior of the channel metric being different when compared to behaviors of other channel metrics may also serve as a distinguishing feature, i.e., as an identity information.

Figure 3B:
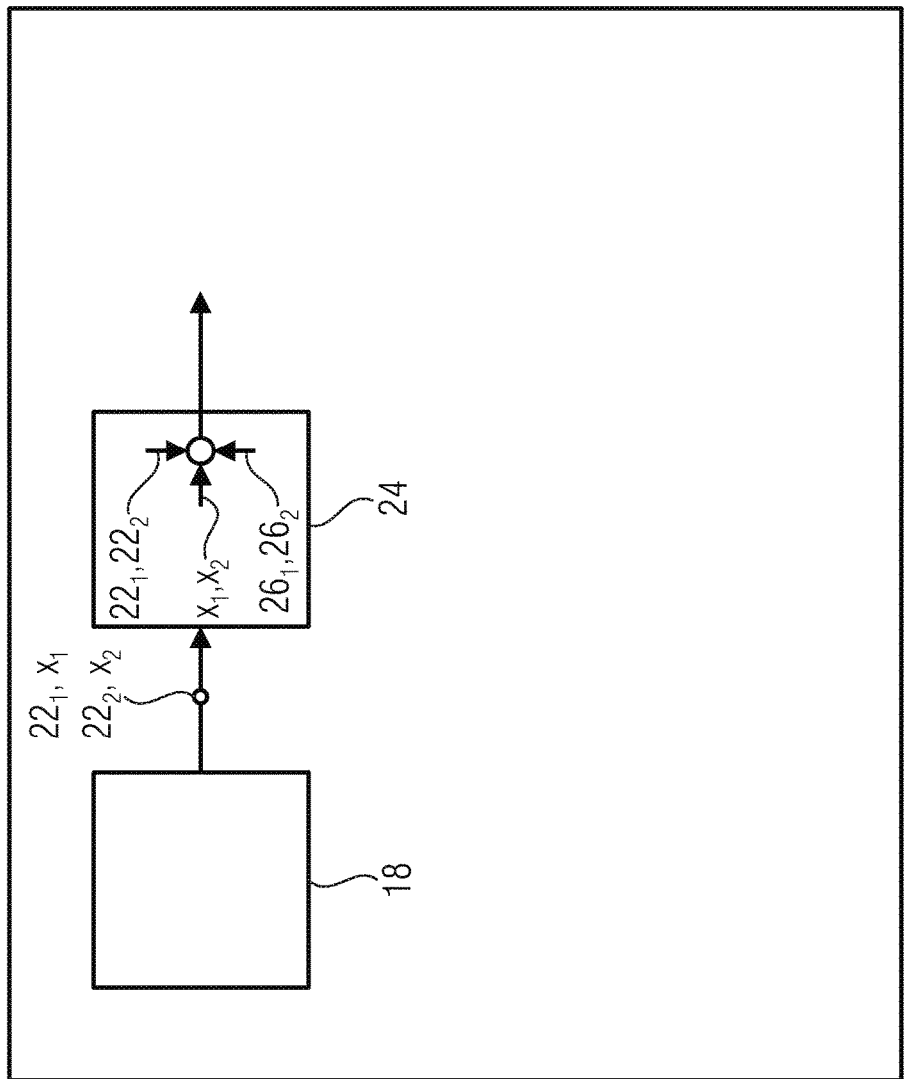
FIG. 3b shows a schematic block diagram of the receiver of FIG. 3a in a scenario in which a wireless signal 14 is a superposition of a first signal and a second signal $28_2$ according to an embodiment.

FIG. 3b shows a schematic block diagram of the receiver 30 in a scenario in which the wireless signal 14 is a superposition of a first signal $28_1$ being, by non-limiting example only, the signal 28 of FIG. 3a, and a second signal $28_2$ being transmitted from a second transmitter $16_2$ over a second channel being indicated as $H_2$ and being representable by a channel metric $x_2$. In other words, the signals $28_1$ and $28_2$ may at least partially overlap in time when arriving at the receiver 30, wherein the receiver 30 receives or sees the wireless signal 14. The signal $28_2$ may be transmitted by using second resource elements. The determiner 18 may be configured for determining the resource information $22_1$ for the signal $28_1$ and the resource information $22_2$ for the signal $28_2$. Further, the determiner 18 may be configured for determining a first channel metric $x_1$ for qualifying and/or quantifying the channel between the transmitter $16_1$ and the receiver 30 and a channel metric $x_2$ for qualifying and/or quantifying the channel between the transmitter $16_2$ and the receiver 30. The associator 24 may be configured for associating the resource information $22_1$ with the channel metric $x_1$ using identity information $26_1$ contained in the signal $28_1$. Further, the associator 24 may be configured for associating the resource information $22_2$ with the channel metric $x_2$ using identity information $26_2$ contained in the signal $28_2$. Thereby, processing of both signals $28_1$ and $28_2$ may be enabled at the receiver 30 although both signals superimpose each other at the receiver 30. Therefore, the transmitters $16_1$ and $16_2$ may operate according to a grant-free access, i.e., they may simply transmit on the channel.

Embodiments allow for determining the used transmission channels, i.e., the resources and the fading in connection with the transmitter so as to establish communication to the transmitter. This allows for a communication overhead reduction in particular in connection with D2D communication. Further, transmitters with reduced or no receiver capabilities are provided which may perform medium access without prior exchange of control messages.

Figure 4:
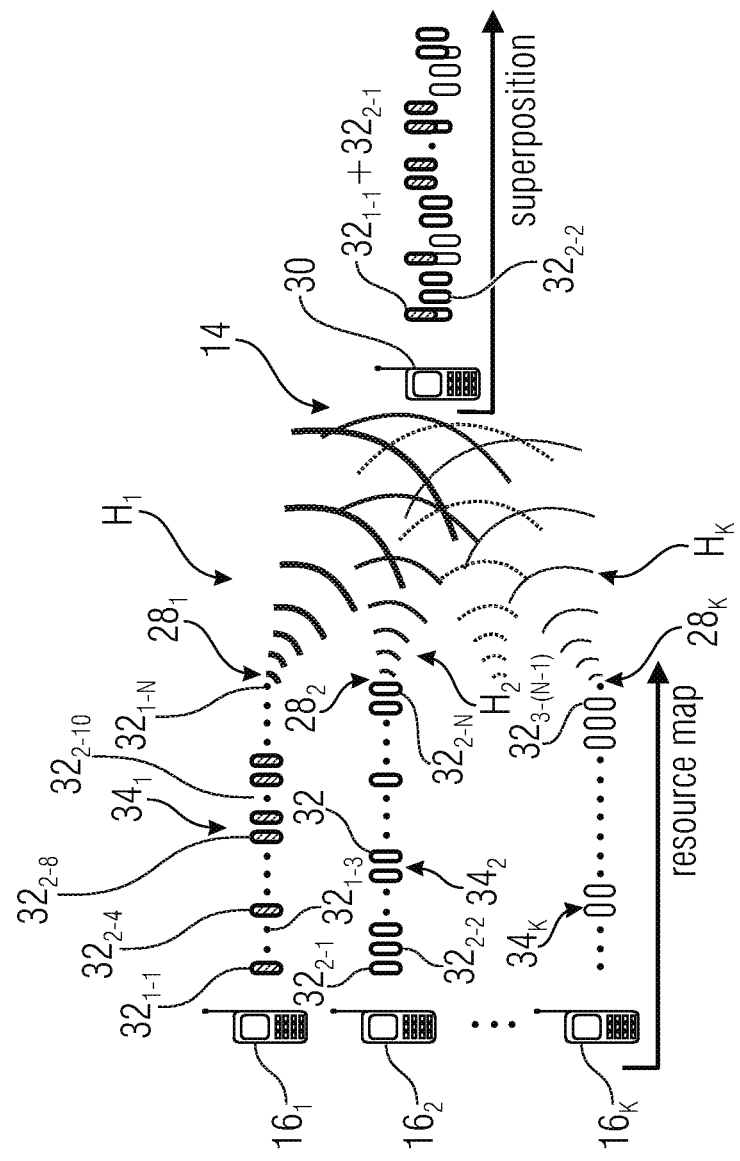
FIG. 4 shows a schematic diagram of a plurality of transmitters according to an embodiment, each transmitting a signal superimposing with each other so as to generate a wireless signal arriving at the receiver.

FIG. 4 shows a schematic diagram of a plurality of K transmitters $16_1$ to $16_K$, each transmitting a signal $28_1$ to $28_K$ over a channel $H_1$ to $H_K$ such that the signals $28_1$ to $28_K$ superimpose with each other so as to generate the wireless signal 14 arriving at the receiver 30. Each of the transmitters $16_1$ to $16_K$ is configured for using a plurality of resource elements 32. By non-limiting example only, each of the transmitters $16_1$ to $16_K$ may use a specific pattern $34_1$ to $34_K$ or resource elements 32, i.e., their arrangement in the respective resource map. For example, the resource map may be represented in the time/frequency domain. Alternatively or in addition, other dimensions may be used, for example, a code domain and/or a spatial domain and/or a power domain. The transmitters $16_1$ to $16_K$ may transmit, e.g., by using overlapping resources and may transmit non-orthogonally. Each additional signal forming a portion in the superposition generating the wireless signal may be detected as a further transmitter at the receiver.

At the receiver 30, the patterns $34_1$ to $34_K$ may overlap or superimpose. For example, a same resource element $32_{1-1}$/$32_{2-1}$ may be used by transmitter $16_1$ and transmitter $16_2$, wherein other resource elements such as the resource element $32_{2-2}$ is only used by transmitter $16_2$. As described in connection with FIGS. 3a and 3b, the receiver 30 may separate the signals $28_1$ to $28_K$ from each other so as to process the respective signals.

Figure 5:
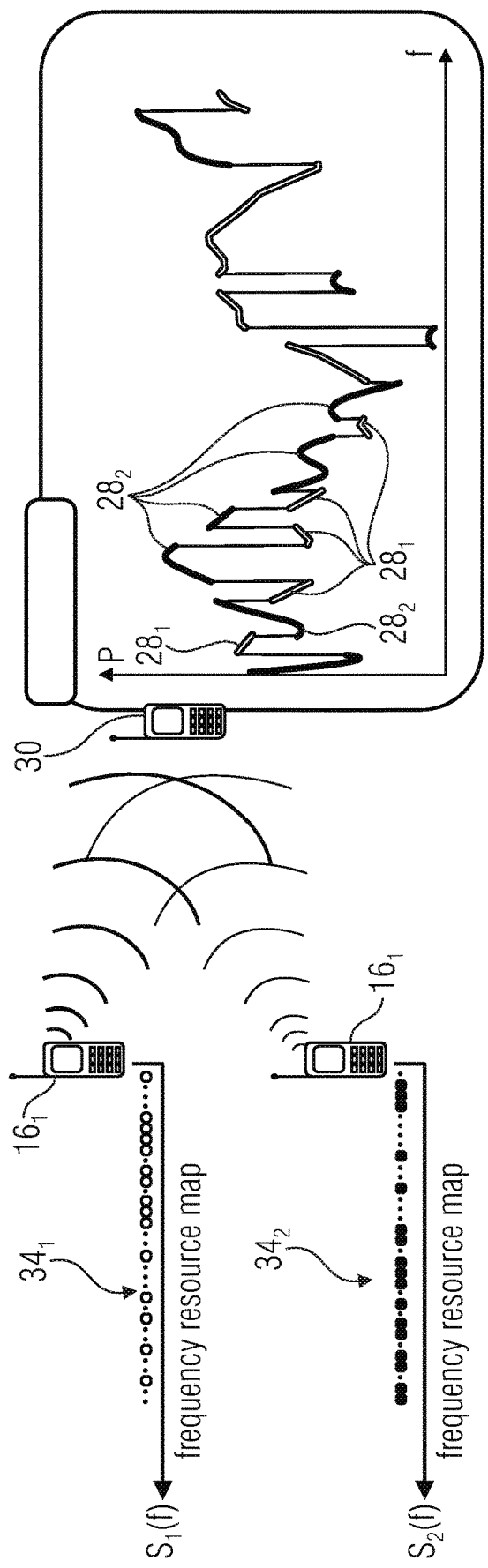
FIG. 5 shows an example wireless system for estimation of a resource map.

In other words, embodiments describe a communication system as well as transmitter and receiver operated therein, which operates in predefined frequency bands without exchanging the resource map between the devices. A simple version of the communication system is illustrated in FIG. 4 for transmitting data from the transmitters $16_1$ to $16_K$ to the receiver 30 and decoding the data at the receiver 30. Each transmitter $16_1$ to $16_K$ may allocate resources independently, i.e., in a distributed manner, such that the resources may overlap at the receiver. The allocated resources can be adjacent and non-adjacent, enabling a larger allocation space. In an example, OFDM system, the allocated resources may be subcarriers over the frequency band as illustrated in FIG. 5. In addition, the receiver 30 is unaware of the chosen resource map of each transmitter $16_1$ to $16_K$, just observing the superposition of the signals $28_1$ to $28_K$ in the wireless signal 14.

The communication system may use the assumption that each transmitter $16_1$ to $16_K$ is located at a different spatial position. Therefore, each signal is experiencing a different wireless channel $h_1$ to $h_K$ to the receiver. In addition, each transmitter $16_1$ to $16_K$ is obliged to allocate sufficient resources, such that the receiver has sufficient information to estimate the wireless channel, the channel metric x respectively, as if the resource map, i.e., the complete schedule, is known at the receiver 30.

When referring now to FIG. 5 and to [2], for estimation of the resource map, in [2] a metric and a brute-force method for a wireless system is described, where the frequency resource map of all transmitters can be estimated by just observing the superimposed received signal. A simple system model with two transmitters $16_1$ and $16_2$ is shown in FIG. 5. Each transmitter $16_1$ and $16_2$ uses exclusive and distributed resources, where the transmitted frequency resources are comprising mere pilot symbols or mere constant amplitude symbols like phase-shift keying (PSK). Each transmitter allocates sufficient number of resources such that the receiver 30 has sufficient information to estimate the wireless channel if the resource map would be known at the receiver 30. In addition, each transmitter $16_1$ and $16_2$ is located at different spatial positions. Therefore, each signal $28_1$ and $28_2$ is experiencing a different wireless channel $h_1$, $h_2$ respectively to the receiver 30. The receiver 30 observes the incoming signal, i.e., the wireless signal 14.

The binary diagonal matrices $S_k$ denote the resource map of each transmitter k, where the matrix S represents the concatenation of the resource maps $S_k$. The diagonal block matrix $\Phi_K$ consists of block entries, for example, with the Fourier matrix $\Phi$. The vector $x_k$ represents the channel metric of transmitter k. In particular $x_k$ is a representation of the transmission signals $s_k$ i.e., the signal 28k of each transmitter k altered by the corresponding channel $h_k$. In other words, $x_k$ is a combination of the transmitted signal 28k and the effects occurring in the channel.

Thus, the superimposed signals of all K transmitter at the receiver such as being based on the two transmitters $16_1$ and $16_2$ of FIG. 5 is $$y = \underbrace{(S_0 \ldots S_{|K|-1})}_{S} \underbrace{\begin{pmatrix} \Phi & \ldots & 0 \\ \vdots & \ddots & \vdots \\ 0 & \ldots & \Phi \end{pmatrix}}_{\Phi_K} \underbrace{\begin{pmatrix} x_0 \\ \vdots \\ x_{|K|-1} \end{pmatrix}}_{x} + n. \quad (1)$$

The respective resource map $S_k$ describing the pattern 34k may be the resource information 22 derived that the receiver. $\Phi_K$ is the frequency conversion block matrix, where each block represents a Fourier matrix. x represents the channel metric. y is the received frequency domain signal, i.e., representing the wireless signal 14, and $\sigma^2$ represents the permitted residual. In particular, there are two options for observing y: (I) the complex frequency components or (II) the power spectral components of the received signal. In the first case, $x_k$ simply represents the time domain channel $h_k$ of transmitter k, since the known transmitted frequency pilots are set to 1 without the loss of generality as described in [2], i.e., $x_k$ is resulting from the convolution of the channel $h_k$ and the transmitted signal $s_k$ with pilots $s_k$ ($x_k = h_k * s_k$), wherein the *-operator represents the convolution-operator. In the second case, $x_k$ represents the circular auto-correlation of the time domain channel of transmitter k, since the transmitted constant amplitude frequency symbols are set to amplitude of 1 without loss of generality as described in [2]. In the second case, the complex received signal still carries the unknown phase information of the transmitters. The receiver jointly estimates the complete resource map S and the concatenated channel metrics x, i.e., the plurality x of metrics $x_k$ by solving the problem $$(\mathbb{S}, x) = \underset{S,x}{\operatorname{argmin}} \|x\|_{\ell_1} \quad (2.1, 2.2)$$

$$\text{s.t. } \|(\mathbb{S} \cdot \Phi_K, x - y)\|_{\ell_2}^2 \leq \sigma^2$$

as described in [2]. As discussed therein, the l1-norm of the channel metric with the side constraint gives a good indicator for the applied complete resource map of all transmitters. As a side product, the corresponding channel metric of each resource map is obtained. If mere pilot symbols are transmitted, the channel metric represents the time domain channel. For the case where mere constant amplitude symbols are transmitted, the power spectral density is obtained. The order of the resource maps $S_k$ within S cannot be or can only hardly be recovered and is ambiguous. I.e., the resource map itself cannot be matched to the corresponding transmitter. Therefore, embodiments use identity information so as to associate the respective resource map $S_k$ (resource information) with the respective transmitter.

Figure 6:
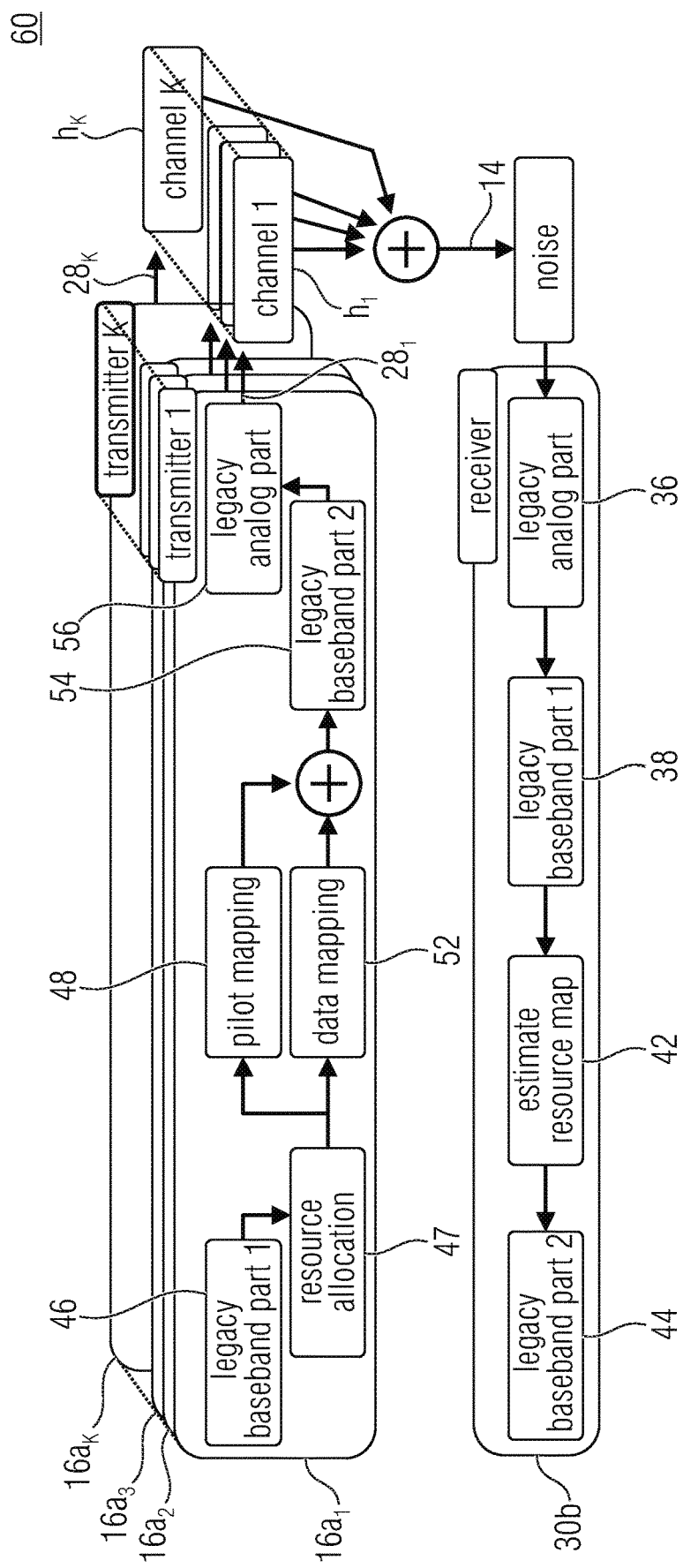
FIG. 6 shows a schematic block diagram of a communication system according to an embodiment.

FIG. 6 shows a schematic block diagram of a communication system such as a wireless network in which a plurality of receivers $16a_1$ to $16a_K$ are configured for transmitting a respective signal $28_1$ to $28_K$ to a receiver 30b. The receiver 30b may receive the wireless signal 14 which is, due to the superposition of the signals $28_1$ to $28_k$, a noise-like signal. The receiver 30b may comprise a legacy analog part enabling reception of the wireless signal 14. The receiver 30b may further comprise a module 38 being a legacy baseband part 1 configured for transferring the wireless signal 14 into the baseband. The receiver 30 may further comprise a determiner/associator 42 being configured for providing the functionality being described in connection with the determiner 18 and the associator 24. For example, the determiner 18, the associator 24 and/or the determiner 42 may be implemented, at least partially, using a processor or micro-processor, a field programmable gate array (FPGA), a central processing unit CPU or other suitable elements. Further, the receiver 30b may comprise a module 44 providing for a functionality of a legacy baseband part 2, i.e., processing the separated signals. Thus, the wireless signal 14 may be received at the receiver 30b using the legacy analog part 36 and may be transferred to the baseband (as a whole) using the module 38. A result of the module 38 may be provided to the determiner/associator 42, wherein the separated signals may be provided to the legacy baseband part 2, i.e., the module 44.

A transmitter according to embodiments described herein may be configured for determining a resource element to be used for transmission of the signal and for mapping at least one pilot symbol and at least one data symbol according to a predetermined rule to the resource element. The transmitter may be configured for generating the signals $28_1$ to $28_K$ by forming a respective signal in the baseband using a respective module 46. According to an example, the signal $28_1$ to $28_K$ may comprise pilot symbols such that the transmitter $16a_1$ to $16a_K$ may be configured for performing pilot mapping using a module 48 and for data mapping using a module 52. The combined pilot symbols and data symbols may be further processed in the baseband using a module 54 and may be transmitted using an analog part 56.

One or more of the transmitters, e.g., the transmitter 16a, may be configured for allocating resources, i.e., to decide which resources are used for transmitting the signal $28_1$. The transmitter 16a, may comprise information indicating resource elements that may be used for transmission and may select one resource element or a plurality of resource elements to be used for transmission from the available resource elements. I.e., the transmitter 16a may comprise a resource selector 47 for selecting the resource elements from a plurality of resource elements in the wireless communications network. The selection performed by the resource selector is at least partially unknown at the receiver. For example, there may be information available at the transmitter and at the receiver indicating predefined sets, for example, according to the patterns 34 described in connection FIG. 4. The transmitter $16_1$ which may be same or similar to transmitter 16a may decide which of the patterns to be used for transmission without indicating the selection by a dedicated signal to the receiver or without being forced to select a specific pattern by the receiver. According to a further embodiment, a transmitter such as the transmitter 16a, may select at least two patterns 34 or a higher number thereof, e.g., at least three, at least five or even more. The receiver may be configured for associating the at least two patterns to the transmitter and may therefore identify which patterns in the wireless signal are selected by the same transmitter.

In other words, the scheduling-free communication system extends the classical processing as being described for LTE in [1] by a joint estimator of the complete resource map of all K transmitters at the receiver as depicted in the transceiver chain FIG. 6. There, the K transmitters communicate in a predefined frequency band. Each transmitter independently allocates resources, wherein the pilot and data symbols are mapped. An example for pilot and data mapping is illustrated in FIG. 7.

Figure 7:
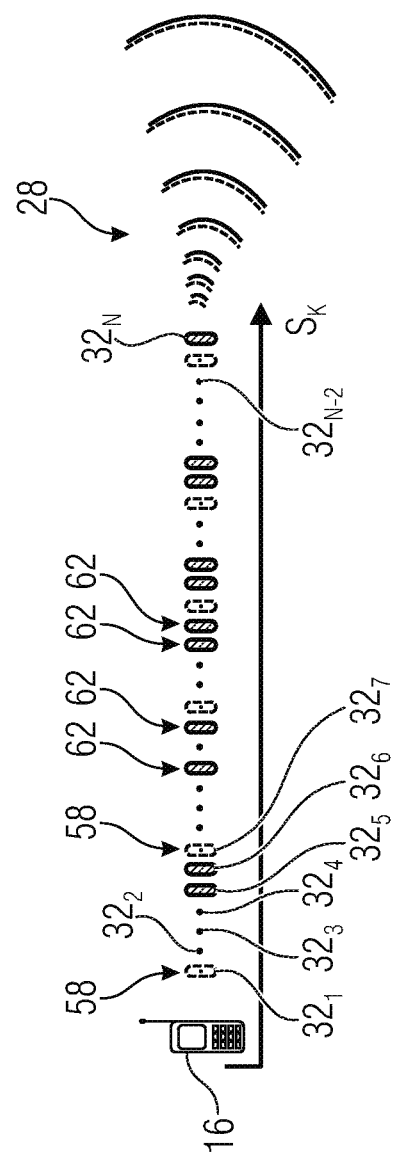
FIG. 7 shows an example graph for pilot and data mapping according to an embodiment.

FIG. 7 shows a schematic diagram of a transmitter 16 performing pilot mapping and data mapping. Schematically there is illustrated the resource map $S_k$ of transmitter 16, comprising a plurality of useable resources $32_1$ to $32_N$, wherein the transmitter 16 is configured for using some of the usable resources $32_1$ to $32_N$. The transmitter 16 is configured for mapping pilot symbols 58 and data symbols 62 on the resources $32_1$ to $32_N$ while leaving some of the resources, for example, resources $32_3$ and $32_4$ unused.

In other words, the resources can be distributed over the different dimensions, frequency, time, space, code and power. In FIG. 7, there is shown an exemplary mapping of data and symbols, where each third occupied resource represents a pilot. A different mapping scheme of pilot symbols may also be used. The used resources themselves are distributed arbitrarily. The distribution of pilots and data within the allocated resources of the transmitter are, for example, known at the receiver.

Knowing the positions of data and pilot symbols of each transmitter, an optimization problem similar to equation 2 can be applied for mixed signals containing data (with constant amplitude symbols as well as multi-level amplitude symbols and pilot symbols). Thus, the complete resource map can be estimated at the receiver. The channel and the corresponding transmitter are obtained through the pilot symbols. Therefore, the data symbols can be equalized and coherent communication may be performed. In such a communication system, it may be important, that the complete resource map of all transmitters is jointly estimated. This may be obtained, for example, when determining the resource map S comprising the resource information $S_k$ of all transmitters having transmitted a signal superimposing in the wireless signal 14. Determining the complete resource map may allow for modeling the information channels, i.e., the transmission of bits from the transmitter to the receiver, according to a memoryless model. I.e., based on the determined information relating to the (complete) resource map and/or the (complete) channel metric, the error corrector may use a respective information channel model. For example, a memoryless channel model may be assumed for error coding. Thus, each bit is assumed to be altered by the memoryless channel model. However, for signal transmission the model may comprise a higher complexity. The layer 1 processing before error correction may therefore recover the bits, such that the memoryless channel is then applicable.

In the described embodiment an information channel or bit channel may be defined between error correction modules 68 and 72. Such a channel is different from the channel h used for transmission of the signals. In other words, the information channel may be modeled by a memoryless channel like the erasure/substitution channel, while channel h may be modeled by a multipath propagation channel or a sparse channel. This may allow for using legacy error correction schemes that are possibly only applicable on memoryless channels like the erasure channel. Alternatively, the resource map may be determined incompletely or possibly comprising errors, i.e., incorrectly such that the transmission is modeled by an insertion/deletion/substitution channel which is a channel with memory. Legacy error codes for insertion/deletion/substitution in communication schemes may be designed to work properly on memoryless channels like the erasure channel. However, in case of insertion/deletion/substitution channel, the channel has memory. Therefore, legacy error codes may be inapplicable.

Figures 8A, 8B, 8C:
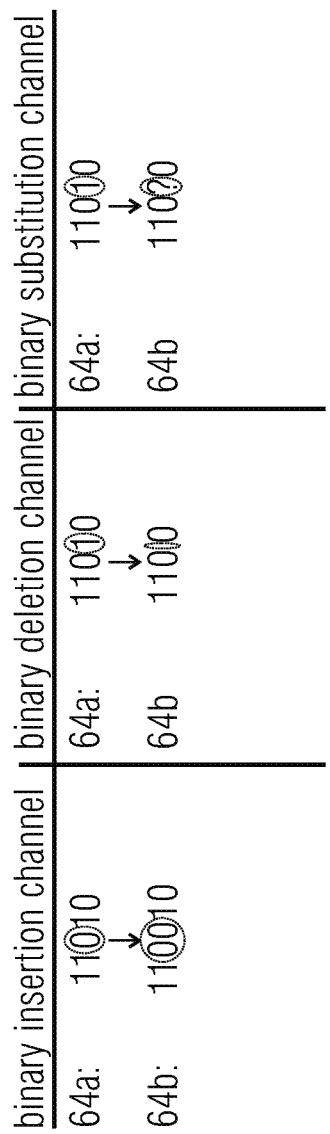
FIGS. 8a-c show a schematic diagram of an example binary version of insertion/deletion/substitution channels.

FIG. 8a shows a schematic diagram of a binary insertion channel in which the transmitted signal 64a differs from a received/decoded signal 64b by having an additional bit. Unknowns in such a channel are the value and the position of insertion of the bit.

FIG. 8b shows a schematic diagram for illustrating the binary deletion channel in which the received/decoded signal 64b misses a bit. Unknowns are the value and the position of deletion.

FIG. 8c shows a schematic diagram for illustrating the binary substitution channel in which the received/decoded signal 64b differs from the transmitted signal 64a by a value of a bit. Unknowns are the value of the respective bit.

In other words, FIGS. 8a to 8c give a short insight to the binary version of insertion/deletion/substitution channels. The binary substitution represents the classical binary erasure channel, which can be handled by the legacy error codes. The value of a bit at unknown positions is unknown. In contrast to that, the deletion and insertion channels result in a shorter or longer received message. There, in addition to the unknown value, also the position of deletion or insertion is unknown. In general, a good design for insertion/deletion/substitution error codes is not known. This is mainly caused by the binary insertion/deletion channel, where even the capacity regions are very coarse as described in [3]. However, for Q-ary alphabets the capacity regions are clearer, and for increasing Q the capacity loss to the erasure channel tends to one bit. For Q-ary alphabets a set of error codes exists. A survey on error correction codes can be found in [4], where the application is mainly on synchronization errors. Nevertheless, outside the classical communication theory, more application exists. One common application of insertion/deletion/substitution error codes lies in bioinformatics, where error identification and correction is performed on DNA sequences as described in [5]. According to embodiments, such error identification and correction is used for receivers and transmitters in wireless communications network. When making reference again to FIG. 4 in connection with FIGS. 3a, 3b and 6, the receiver may determine the respective resource information relating to the transmitters 16, for example, by determining a solution for equation 2. The determiner 18 may be configured for determining the resource information based on a predetermined rule according to which pilot symbols and data symbols are mapped in the resources, the resource map S used by the transmitted signal. By using this information, separation of the signals may be enhanced or enabled. When referring to FIG. 4, the patterns $34_1$ to $34_K$ may be known at the receiver such that the receiver may have knowledge by using a number of resource elements, such as the resource elements $32_{1\text{-}1}$ and $32_{2\text{-}4}$ and/or a different number and/or a different resource element and/or by leaving other resource elements such as the resource elements $32_{1\text{-}3}$ unused, other resource elements such as the resource element $32_{2\text{-}8}$ are also used by the same transmitter and/or that other resource elements such as the resource element $32_{2\text{-}10}$ are unused by this transmitter. This may therefore allow to determine resource elements that are used by more than one transmitter and/or to identify a respective transmitter 16 which has used the respective resource element in the superimposed signal 14.

When using the pilot symbols at the transmitter, the receiver may be configured for determining the resource information so as to comprise real values for data symbols and complex values for pilot symbols of the wireless signal 14. The receiver may be configured for determining the resource information based on the determination rule $$x_{k,d} = (h_k * s_{k,d})$$

wherein $$x = \begin{pmatrix} x_1 \\ \vdots \\ x_k \\ \vdots \\ x_K \end{pmatrix}$$

is the wireless signal being representable as $x_k \in \{x_{k,p}, x_{k,d}\}$, where the pilot signal $x_{k,p} = (h_k)$ is the $k^{th}$ channel and $x_{k,d}$ is the data signal being the convolution of the $k^{th}$ channel with the $k^{th}$ transmission signal, wherein y is the received frequency domain signal with a mix of complex values and mere amplitude values.

Further, when using the pilot symbols at the transmitter side, the receiver, in particular the determiner, may be configured for determining the channel metric based on a predetermined rule according to which pilot symbols are mapped in the resources used by the signal, using the pilot symbols contained in the wireless signal. I.e., the receiver may be configured for determining the channel metric using the pilot symbols. The determiner may further be configured for determining the resource information for all transmitters, i.e., a resource information for each signal contained in the wireless signal so as to obtain an overall resource information, for example, the resource map S. The determiner may be configured for determining a channel metric for each channel associated to a signal 28 in the wireless signal 14 so as to obtain an overall channel metric. The determiner may further be configured for determining the overall channel metric according to a multipath propagation model, i.e., a sparse channel model. The wireless channel follows a multipath propagation model, which is caused by obstacles in the environment. Thus, the typical channel impulse response of a wireless channel is sparse [8]. I.e. the channel impulse response consists of only a small number of relevant non-zero entries. In other words, only a small number of non-zero entries are used to have a good representation of the channel impulse response. Sorting the magnitudes of the channel impulse response results in a vector with a fast (exponential) decay. For the cyclic autocorrelation of the channel impulse response the sparse property still holds, since the autocorrelation preserves the sparsity of the underlying vector. However, the number of entries of the cyclic autocorrelation of the channel impulse response increases compared to the channel impulse response.

Receivers may operate by using exclusive resources or non-exclusive resources. For the case that the transmitter operates on exclusive resources, the resources are not interfering to each other at the receiver. Thus, the entries of the resource map S in equation 1 reflects the resource assignment with the symbol power (multi-level amplitude symbols) of each transmitter. For PSK symbols, the entries are binary and thus, the sum of each row of S is binary. After obtaining the resource map S the receiver can simply decode the data of each transmitter independently. For the case, that each transmitter allocates resources independently, the receiver observes overlapping resources as shown in FIG. 4. Thus, for PSK symbols, the entries are still binary, but the sum of each row of S is equal or larger than 0. This reflects the fact that a single resource is assigned to multiple transmitters. Nevertheless, the problem in equation 2 still obtains the corresponding resource map of all transmitters. Afterwards, the data of each transmitter may be decoded at the receiver. For just minor overlaps, the interfering symbols are treated as noise, such that error corrections recovers the original message of each transmitter. In addition, interference cancellation techniques may be used. For larger overlaps, orthogonal codes can be applied to have the ability to still recover the original message.

For exclusive resources the following may apply: S=$(S_1 \ldots S_k \ldots S_K)$, where $S_k = s_k \cdot I$, where $s_k \in \{0, 1\}$ is the resource map row vector of the km transmitter and I is the identity matrix. When the resources are assigned exclusively to each transmitter then $\Sigma_{\nabla k} S_k = s \cdot I$, where $s \in \{0,1\}$.

For non-exclusive resources the following may apply: S=$(S_1 \ldots S_k \ldots S_K)$, where $S_k = s_k \cdot I$, where $s_k \in \{0,1\}$ is the resource map row vector of the $k^{th}$ transmitter and I is the identity matrix. The resources are assigned non-exclusively to each transmitter, thus, $\Sigma_{\nabla k} S_k = S \cdot I$, where $s \in \{0, \ldots, K\}$.

An example for an overlapping of two resources at frequency index l: The side constraint $\|(S \cdot \Phi_K \cdot x) - y\|_{l_2}^2 \leq \sigma^2$ is formulated as a scalar constraint at frequency index l $$((\Phi_l \cdot x_{k_1}) + (\Phi_l \cdot x_{k_2}) - y_l)^2 = (\Phi_l \cdot (x_{k_1} \cdot x_{k_2}) - y_l)^2 \leq \sigma_l^2$$

Thus, the both frequency indexes are used to achieve the residual within bounds. I.e., the determiner may be configured for determining the resource information for a first and a second signal superimposing each other at least partially in the wireless signal 14 by using at least one common resource element, i.e., the transmitters having transmitted their respective signal use the same (common) resource element. Similar techniques are used in code division multiple access (CDMA) and sparse code multiple access (SCMA).

Figure 9:
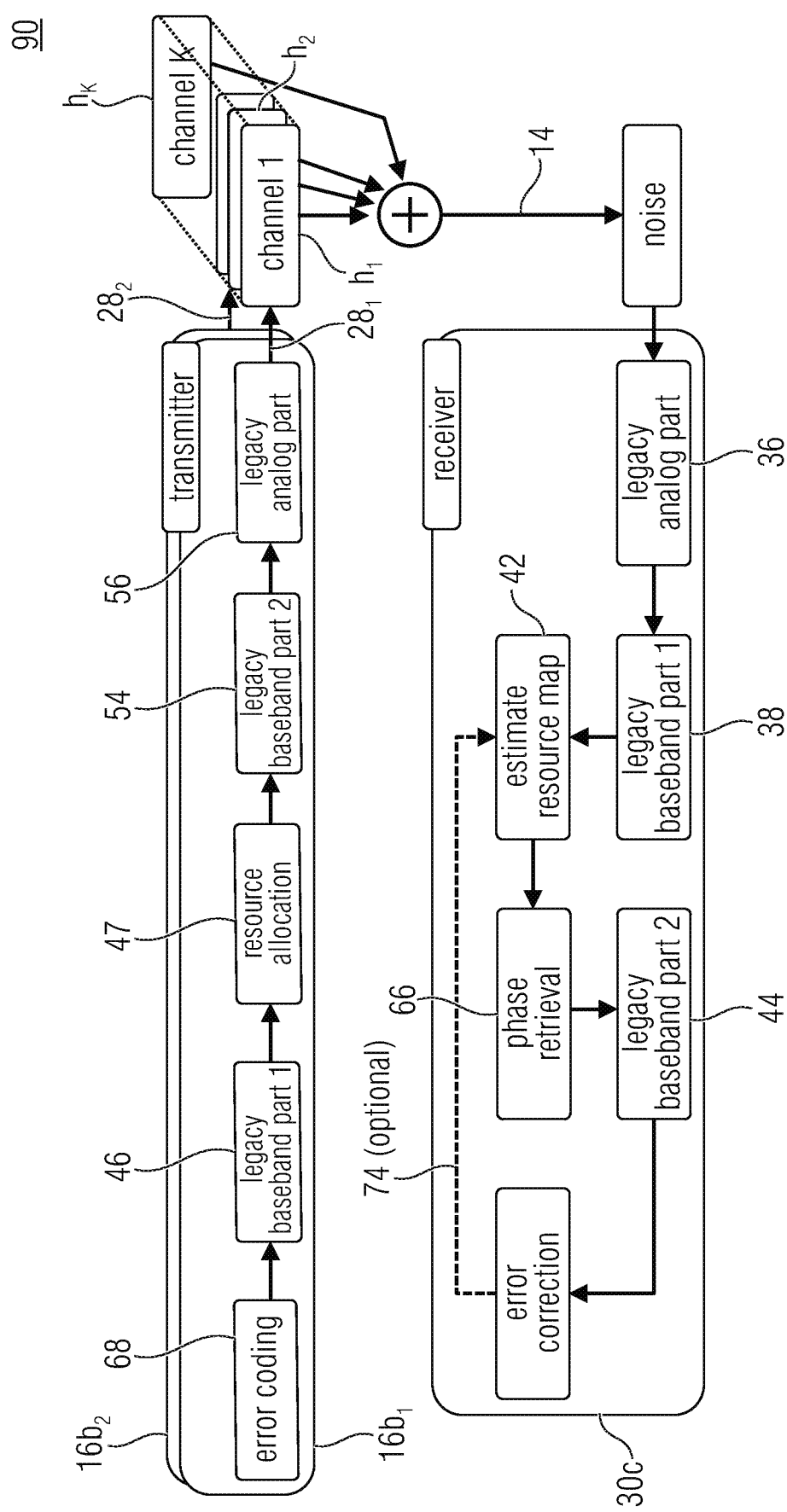
FIG. 9 shows a schematic block diagram of a wireless network according to an embodiment.

FIG. 9 shows a schematic block diagram of a wireless network 90 comprising a transmitter 16b1 using channel $h_1$ for transmitting the signal $28_1$. The wireless network 90 may comprise a second transmitter 16b2 which may be same or different from transmitter 16b1. The transmitter 16b2 may transmit the signal $28_2$ via the channel $h_2$. Although having illustrated a number of K channels, some of them may be unused, e.g., all channels except for $h_1$ and $h_2$. The wireless network 90 further comprises a receiver 30c for receiving the wireless signal 14. When compared to the wireless network 60, the transmitter 16$_1$ and the receiver 30b respectively, the transmitter 16b1 is configured for performing error coding and the receiver 30c is configured for performing error correction. The error coding may be executed according to the predefined model of the information channel, the memoryless channel model or the insertion/deletion/substitution channel model. The error corrector may be set up correspondingly. The model of the information channel may be known in advance. Therefore and in accordance with embodiments, it may be advantageous to use IDS model, since it works well or has at least a high reliability.

Further, the transmitter 16$b_1$ is configured for transmitting the wireless signal 28 without using pilot mapping as described in connection with FIG. 6 such that in the wireless signal 14 at least for the component of the signal 28 a channel estimation using the pilot symbols is not applicable. The receiver 30c may comprise a channel determiner 66 configured for performing phase retrieval. The channel determiner 66 may be configured for determining information related to a phase change and/or an amplitude change experienced by a respective signal 28 travelling through the respective channel $h_1$ or of the channel $h_2$. I.e., a signal travelling through a channel may be changed, altered or modified with respect to the amplitude and/or the phase. For example, the signal 28 carrying pilots may allow the channel determiner to determine the information related to the amplitude change or simply the amplitude and the information related to the phase change of the signal directly from the received signal which is probably not possible for signals carrying no pilots, i.e., mere amplitude signals. The channel determiner 66 may determine the gain of the channel describing the alteration or change in the complex power of the signal and therefore the amplitude as well as the phase. Alternatively or in addition, the channel determiner 66 may also determine the amplitude and/or the phase from the channel metric and/or may be formed integrally with the determiner an may be configured for determining the channel metric.

In classical communications systems, pilots known to transmitter and receiver are embedded into communication signals. These known pilots are used to estimate the channel between the transmitter and the receiver and establish a coherent communication link. The residual data is obtained by equalizing the received signal with the estimated channel. In contrast to that, phase retrieval techniques such as described in [7] may recover the phase and amplitude of the communication channel by mere amplitude measurement as described in [6]. Thus, the phase of the signal 28k can be used as further degree of freedom to embed, e.g., data. In general, phase retrieval recovers the phase and amplitude of a channel up to an unresolvable ambiguity, like the global phase. Differential coding can be used to gain independence from the global phase.

The receiver 30c may be configured to use the phase for decoding the wireless signal 14, i.e., for decoding the signals $28_1$ to $28_2$. The associator/determiner 42 or the determiner 18 may be configured for determining the respective resource information and the channel metric based on the determination rule $$(S, x) = \underset{S,x}{\operatorname{argmin}} \|x\|_{l_1}$$

such that $$\|(S \cdot \Phi_K \cdot x) - y\|_{l_2}^2 \leq \sigma^2$$

wherein S is a resource map of all K transmitters containing the resource information, $\Phi_K$ is a frequency conversion block matrix, where each block represents a Fourier matrix, x is a circular auto-correlated transmission signal altered by the channel and representing the channel metric, y is the received frequency domain signal with mere amplitude values and $\sigma^2$ represents a permitted residual.

$S=(S_1 \ldots S_k \ldots S_K)$, where $S_k=s_k \cdot I$, where $s_k \in \{0,1\}$ is the resource map row vector of the $k^{th}$ transmitter and I is the identity matrix;

$$\Phi_K = \begin{pmatrix} \Phi & 0 & \ldots & 0 \\ 0 & \Phi & \ldots & 0 \\ \vdots & \vdots & \ddots & \vdots \\ 0 & 0 & \ldots & \Phi \end{pmatrix}$$

is a block matrix with K blocks of $\Phi$, converting the solution x into the frequency domain, where 1 represents then the Fourier matrix;

$$x = \begin{pmatrix} x_1 \\ \vdots \\ x_k \\ \vdots \\ x_K \end{pmatrix},$$

where $x_k = CAC(h_k * s_k)$ is the circular auto-correlation (CAC) of the convolution of the $k^{th}$ channel with the $k^{th}$ transmission signal. y is the received frequency domain signal with mere amplitude values. $\sigma^2$ represents the permitted residual, for example the noise variance.

Alternatively or in addition to omitting the pilot symbols and using the phase retrieval using the channel determiner 66, the transmitter 16₁' may perform error coding using an error coder 68 so as to encode the information to be transmitted, for example, using an error code suitable for the channels as described in connection FIGS. 8a-8c, i.e., the error corrector 72 may be configured for implementing an error code for insertion, deletion and/or substitution errors. The receiver 30c may comprise an error corrector 72 for correcting at least one bit error in the received signal 28₁ and/or 28₂ using the resource information. As described before, the determiner/associator 42, the determiner respectively, may be configured for determining the overall channel metric so as to obtain a channel model according to a memoryless model and therefore allowing for performing error correction schemes using such a model. For implementing a respective error correction the error corrector 72 may use the overall channel metric and/or the resource information of the transmitters, i.e., an overall resource information. By thereby modelling the complete channel, error correction may be allowed or at least enhanced. In particular, a resource map being filled by at least 70%, 90% or 95% may allow for assumptions that specific errors such as insertions may not be present, e.g., because of every symbol being used/occupied there may no further bit between two decoded bits, especially when the number of symbols and therefore bits is known.

As an optional feature, the receiver 30, 30c may comprise a feedback 74 from the error corrector 72 to the determiner, the determiner/associator 42 respectively. This may allow for iteratively determining the resource information. Thereby, the determiner may obtain correction information indicating a result of the error correction and may adjust a determination of the resource information dependent on the correction information. I.e., the determiner may obtain information if the error correction is performed correctly which may depend on the channel and/or the channel metric. Thereby, when determining that the error correction is insufficient, the channel and the channel metric may be determined again or more accurately. In other words, providing a feedback link 74 from the error correction 72 to the resource map estimation at the determiner, similar to turbo receivers, allows for reducing the errors by estimating the resource map information.

For the estimation of the resource map, the determiner may have knowledge about a probability of some of the bits to be decoded, for example, when regarding a header of a data format or the like. Bits with a high probability may be regarded as reference or pilot-like and may be indicated by the respective decoder. Although the feedback 74 is illustrated as being fed by the error corrector 72, it may also be fed by the legacy baseband part 2.

As for the default turbo receiver, the most probable bits are assumed to be correct with respect to their position and value and used as pilots in the next iteration for determining the channel map. If the full information of all signals is obtained, convention error correction schemes for memoryless channel as for turbo receivers may be used. The model can be therefore, expressed as a memoryless channel, but the number of unknowns is large. Thus, although even for full knowledge of the signals the conventional error correction may entail a large amount of computational power, it may still improve the decoding.

In other words, according to embodiments, the extension of the communication system is performed to mere data resources, i.e., avoiding pilot symbols and therefore omitting the pilot resources. The respective transceiver chain is shown in FIG. 9 with an additional block on the receiver side in comparison to FIG. 6, i.e., the channel determiner 66. The transmitter 16b performs the resource mapping for mere data symbols, i.e., avoiding mapping of pilot symbols. The receiver 30c estimates the resource maps of each transmitter by solving equation 2. However, only, the power spectral density representing the circular auto-correlation (CAC) of the time domain channel is obtained for each transmitter. To obtain the channel impulse response and therefore the phases and amplitudes of channels in the frequency domain a phase retrieval technique may be implemented using the channel determiner 66. Such a technique is described, for example, in [6]. Generally, phase retrieval refers to the approach of recovering phase and amplitude of a channel up to an unresolvable ambiguities only from intensity measurements obtained by the receiver. A trivial unresolvable ambiguity is the global phase. Differential coding can be used to gain independence from the global phase. A way to resolve other remaining ambiguities has been described in [6]. I.e., the transmitter may be configured for using a channel metric indicating a channel characteristic of at least a part of a channel from the transmitter to the receiver. The resource selector 47 may be configured for selecting the set of resource elements to be used from the useable resource elements dependent on the channel metric. Alternatively or in addition, other characteristics may be considered, for example, a low or lowest attenuation or a high or highest gain available. The channel metric may be determined by the transmitter itself or may be obtained, for example, by a feedback from the receiver.

I.e., the determiner may be configured for determining a resource information for each signal contained in the wireless signal 14 so as to obtain an overall resource information, for example the resource map S. The receiver may comprise a decoder configured for decoding a first signal so as to obtain a first message transmitted with a first signal 28₁ and for decoding a second a signal so as to obtain a second message transmitted with the second signal. The decoder may be a part of the error corrector 72. The channel determiner 66 may be configured for determining information related to phase and amplitude of the channel $h_1$ and the channel $h_2$ up to unresolvable ambiguities. The error corrector 74 may be configured for correcting at least one bit error in the signal $28_1$ and/or $28_2$ using the overall channel resource information. Alternatively, the error corrector 74 may use at least the respective resource information determined for the respective signal for error correction, i.e., a partial knowledge of the overall resource information may also be sufficient as long as the partial knowledge covers the information for the respective signal.

Although the wireless communication networks 60 and 90 are described as comprising same transmitters 16 or $16b_1$, a wireless network according to embodiments described herein may also comprise transmitters being different when compared to each other, for example at least one transmitter 16 and at least one transmitter $16b_1$. In particular, some transmitters may perform error coding whilst other transmitters may skip such a step. Alternatively or in addition, some transmitters may use pilot symbols whilst other transmitters transmit their signals without pilot symbols. According to embodiments, the receiver is configured for evaluating the wireless signal 14. Based on an evaluation result, the receiver may change its operation mode. For example, the receiver 30c may skip error correction in a case when it determines that the signals $28_1$ and $28_2$ have been transmitted without error coding. Alternatively or in addition, the channel determiner 66 may remain without operation when pilot symbols are transmitted in the signals $28_1$ and/or $28_2$ and may provide the result of the determiner/associator 42 to the legacy baseband part 44.

Figure 10:
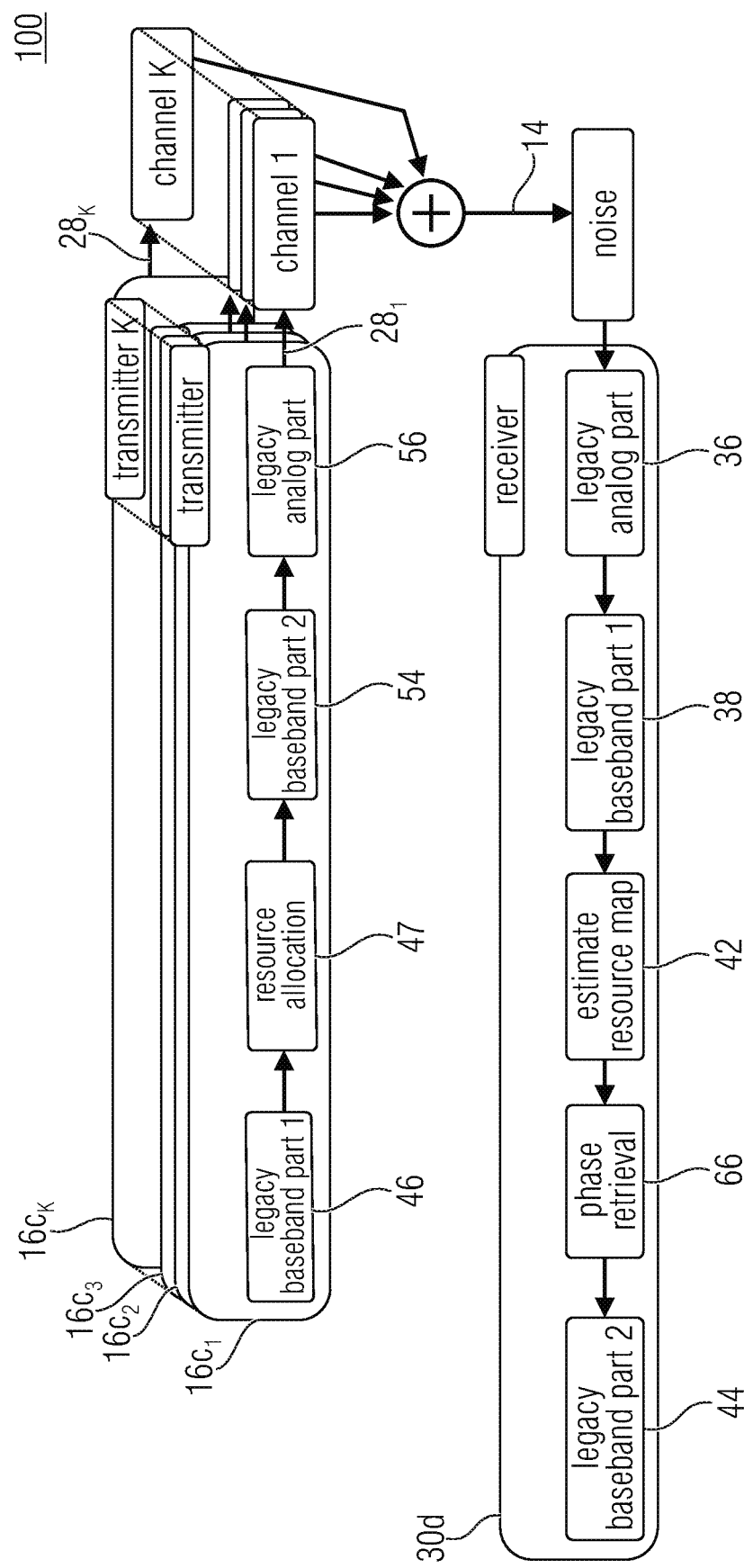
FIG. 10 shows a schematic diagram of a wireless network according to an embodiment, comprising wireless transmitters and a receiver.

FIG. 10 shows a schematic diagram of a wireless network 100 comprising wireless transmitters $16_1"$ to $16_K"$ and a receiver 30d. When compared to the transmitters 16', the transmitters 16" omit error coding and additionally omit the pilot symbols when compared to the transmitter 16.

The receiver 30e comprises the channel determiner 66 when compared to the receiver 30. Functionality of error coding as described in connection with FIG. 9 may be present in the transmitters and/or receiver but may remained unused, for example, when the signals $28_1$ to $28_K$ are transmitted without error codes.

Figure 11:
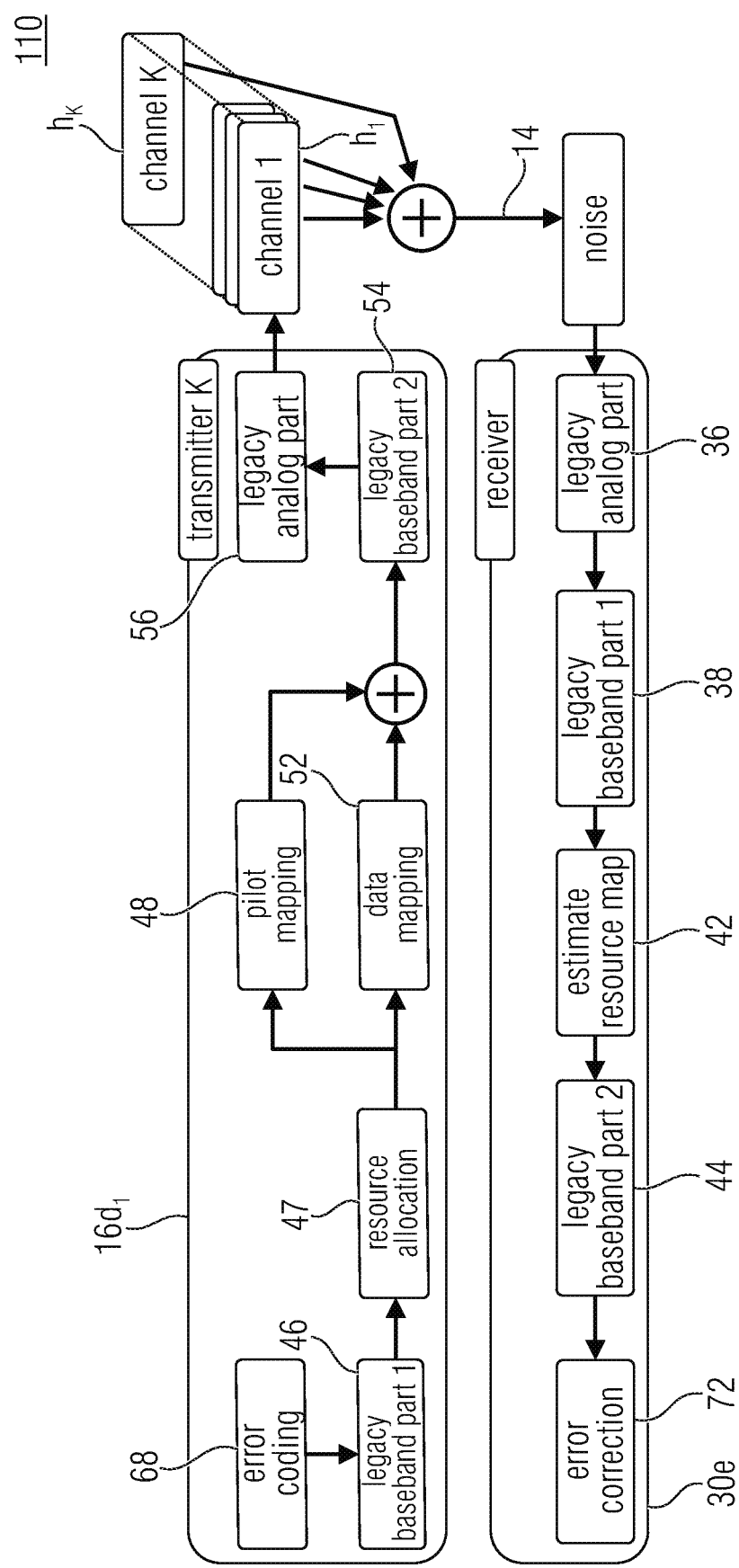
FIG. 11 shows a schematic block diagram of a wireless network according to an embodiment, comprising a possibly single transmitter and a receiver.

FIG. 11 shows a schematic block diagram of a wireless network 110 comprising a possibly single transmitter $16d_1$ and a receiver 30e. The transmitter $16d_1$ may be configured for performing error coding, i.e., it may comprise the error coder 68. Further, the transmitters $16d_1$ may be configured for using pilot symbols and may map pilot symbols using module 48 and may map data symbols using module 52, i.e., pilot mapper 48 and data mapper 52. In other words, the insertion/deletion/substitution (IDS) error code can also be combined with the transmission of pilot subcarriers and/or symbols neglecting the phase retrieval using the channel determiner 66.

Using error correction and/or omitting pilot symbol may entail the decoding of the complete resource map of all transmitters transmitting the wireless signal 14, since errors in the resource map estimation in the single transmitter case leads to unresolvable errors for legacy error correction methods for memoryless channels. Therefore, according to embodiments, the channels are modeled according to insertion/deletion/substitution (IDS) channels. Especially for non-binary channels error codes exist. Omitting a transmission of pilot symbols by IDS error coding, the receiver decodes the message of each transmitter independently. Only the resource map may be obliged to be jointly estimated for all transmitters. Nevertheless, the receiver still observes the superimposed transmitters signals, i.e., the wireless signal 14. The transmitter signal of interest is selected with the consecutive process of phase retrieval and IDS error correction. For selecting the respective signal, a transmitter identification may be performed. This may include solving the problem in equation 2 which does not lead to a unique solution of S. The order of the resource map $S_K$ cannot be uniquely identified. Thus, the estimated resource map $S_k$ and the corresponding channel metric $x_k$ cannot be assigned to the corresponding transmitter without prior knowledge. I.e., the originator of the channel metric $x_k$ is not known. However, the raw (bit) message of the unknown transmitter can be decoded independently from the knowledge of its origin, since the resource map is estimated. To obtain origin of the channel metric $x_k$ multiple ways are possible. The transmitter may encode its unique identifier into the transmitted signal. Alternatively or in addition, the transmitter may encode its unique identifier into the resource map $s_k$. Alternatively or in addition, the receiver may obtain the identity by the fingerprints of the channel metric compared to the previous reception. For stationary channels, e.g., where the position of the transmitter and receiver is fixed or only slowly varying, the channel metric will be very similar to the previous channel recordings.

Figure 12:
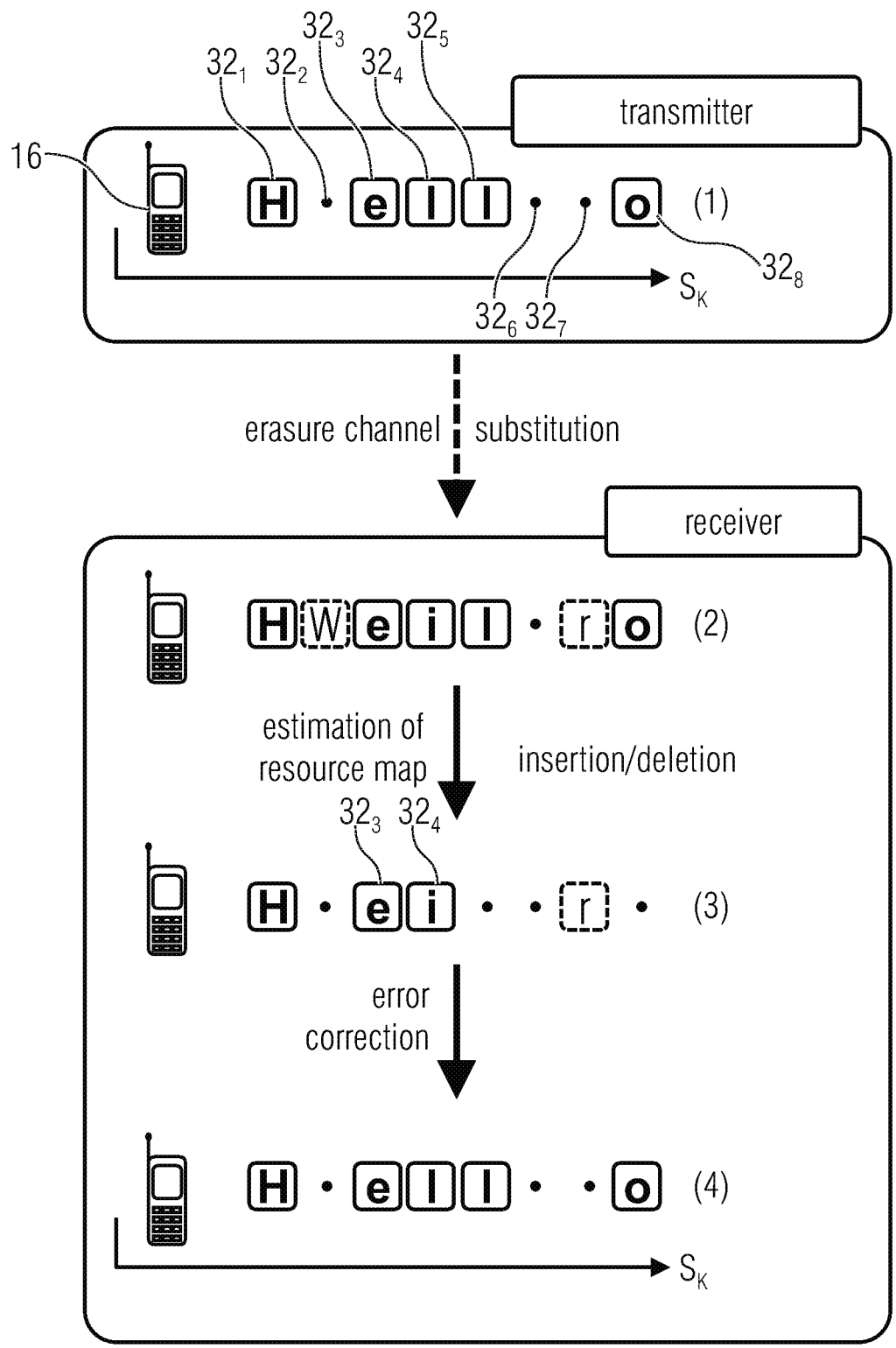
FIG. 12 shows a schematic diagram of error introduction due to noisy channel and resource map estimation and its correction by IDS error code according to an embodiment.

Estimating an incorrect resource map, the IDS error coding corrects the IDS errors and reconstructs the original message. By way of example, FIG. 12 shows a simplified flow chart of a communication using IDS error correction according to an embodiment. Distributed resources are allocated by the transmitter 16, i.e., not all used resource elements $32_1$, $32_3$, $32_4$, $32_5$ and $32_8$ are adjacent with respect to each other and/or some resource elements there between such as the resource elements $32_2$, $32_6$ and/or $32_7$ are unused by the transmitter 16. As described in connection with FIG. 9 the message "Hello" may be encoded as a message into the respective signal 28. The message "Hello" is transmitted over a classic erasure channel as depicted in step (1). Thus, a substitution error occurs and the message is altered, by way of example to "Heilo". In addition, the remaining resources are partially allocated by other transmitters, resulting in a message mix up "HWeilro" as depicted in step (2). The resource map is estimated, thus, only resources belonging to the same transmitter are selected. However, the estimation process introduces insertion and/or deletion errors, resulting in a message "Heir" as shown in step (3). Now, using IDS error correction, the insertion and deletion errors as well as the substitution errors may be corrected, such that the original message "Hello" in step (4) is retrieved. This assumes that the order of the message parts, i.e., the order of the identified resource elements, is not altered by the IDS channel.

FIG. 12 shows a concept in which errors introduced due to noisy channel and resource map estimation and its correction by IDS error code is shown. In this setting, the classical IDS error coding schemes may even be improved, since the resources are distributed over a predefined grid. Thus, deletion errors can only occur, where non-allocated resources are between two selected resources. Between directly adjacent resources, deletion errors are impossible. Taking the example in step (3), between the letters "e" and "i" in the resource elements $32_3$ and $32_4$, a deletion error is impossible. Extending this, the maximum number of deletion errors are defined by the number of resources like between two select resources. An IDS scheme taking this into account can increase the error correction performance. Thus, according to an embodiment, the error corrector 72 is configured for using information indicating a position of resource elements in the resource map for error decoding.

Transmitters according to embodiments may be configured for using constant amplitude symbols or multi-level amplitude symbols. When using constant amplitude symbols, in the communication system, each transmitter transmits data on the allocated resources to the receiver, wherein the receiver is able to decode the data without knowledge of resource map of each transmitter. If the data consists of constant amplitude symbols like PSK (phase-shift keying), the resource map can be obtained simply by equation 2 observing the power spectral density of the received signal. In the case of multi-level amplitude symbols, i.e., the amplitude may comprise at least one value between a minimum value (e.g., 0) and a maximum value (e.g., 1), the determiner of the receiver may be configured for determining the resource information as a plurality of resource values, e.g., in a matrix form and/or in form of one or more vectors, and to determine each of the plurality of resource values so as to comprise one of at least three values. In other words, in the case that data consists of multi-level amplitude symbols like higher order modulations, equation 2 has to be modified to estimate the complete resource map. Instead of S being a mere resource map with binary entries, S has to be relaxed to support the multi-level amplitudes. E.g., for the classical Quadrature Amplitude Modulation (QAM) of order four (16-QAM), three levels may be used. In particular, the resource map $S \in \{0, 1, 5, 9\}$ for power spectral density observation of the received signal may be used. Any other selection of values may be used.

FIG. 13 shows a schematic block diagram of a transmitter 16 according to an embodiment. The transmitter 16 is configured, like the other transmitters described herein, for wirelessly transmitting the signal 28 using resource elements of a wireless communications network. The transmitter 16 comprises the resource selector 47 for selecting the resource elements from a plurality of resource elements in the wireless communications network, wherein the selecting is at least partially unknown at the receiver. The transmitters 16a-d described herein may be similar to the transmitter 16. I.e., the explanation given with respect to one of the transmitters 16, 16a, 16b, 16c or 16d may be used also in connection with respective other transmitters as long as not stated otherwise.

According to embodiments, the selected resource elements are a plurality of resource elements or even a high number thereof, for example, at least two, at least five, at least ten or even more. To increase the reliability of the resource map estimation process at the receiver, resource blocks can be used, each resource block comprising a predefined set of resource elements. When referring again to FIG. 12, for example, the resource elements $32_1$, $32_3$, $32_4$, $32_5$ and $32_8$ may form a block of the available resource elements $32_1$ to $32_8$. Alternatively or in addition, the patterns described in connection with FIG. 4 may also be regarded as a block. In [2] the superior performance of resource blocks is shown. A resource block consists of a predefined number of resources, wherein the location of the resources in the resource maps, i.e., the pattern 34 may be known at the receiver and at the transmitter and may therefore form a common knowledge of the transmitters and receivers. As described in [2], the resource block may comprise adjacent resources, i.e., the resource block may consist of a probably known number of adjacent resources, wherein this does not preclude the use of additional resources when compared to the pattern.

Figure 14A:
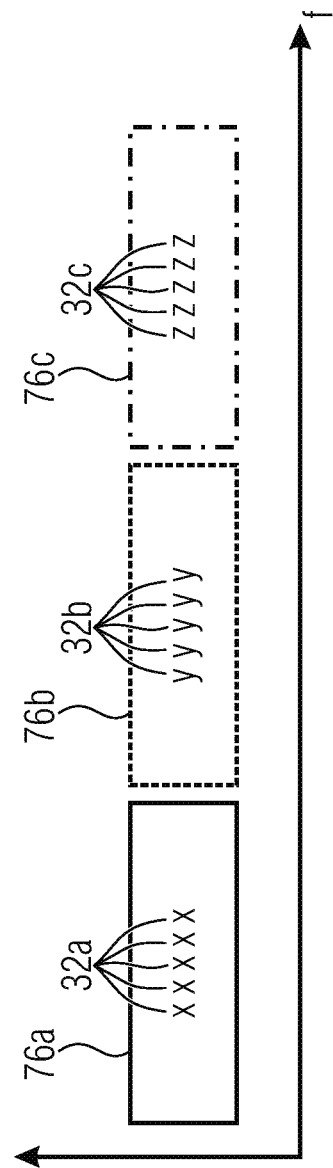
FIG. 14a shows a schematic diagram of blocks each comprising resource elements, according to an embodiment.

FIG. 14a shows a schematic diagram of blocks 76a, 76b and 76c each comprising resource elements 32a, 32b, 32c respectively. The resource elements 32a are arranged adjacently with respect to each other, i.e., there is no different resource element arranged between two resource elements within a block. The term adjacent relates to a specific dimension in the access scheme of the wireless network, for example, time, code, frequency and/or power, wherein FIGS. 14a and 14b refer to frequencies f, by example. Adjacent resource elements may therefore refer to, for example, adjacent subbands in the frequency domain. Alternatively, adjacent power levels, adjacent time slots or adjacent codes in the code space may be used.

Figure 14B:
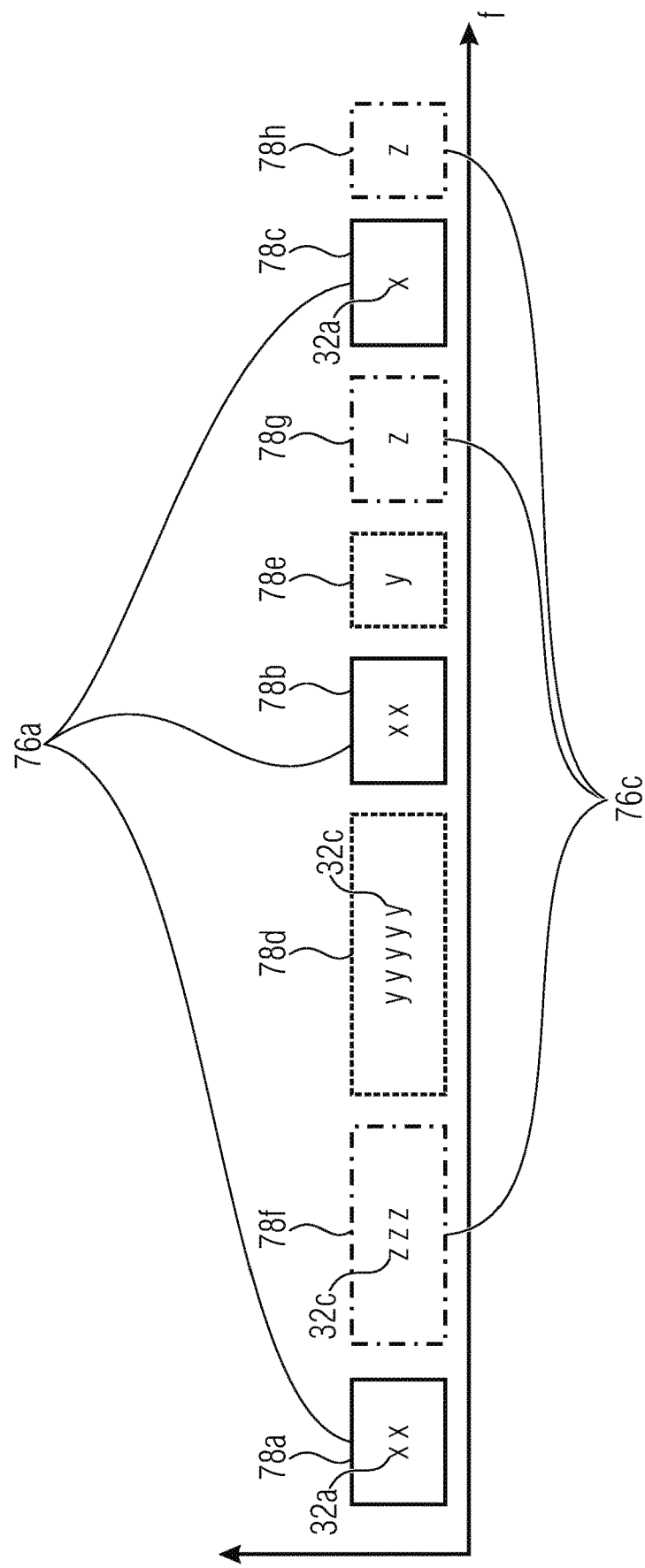
FIG. 14b shows a schematic diagram of distributed resources elements in which the blocks are formed by sub-blocks according to an embodiment.

FIG. 14b shows a schematic diagram of distributed resources elements in which the blocks 76a to 76c are formed by sub-blocks 78a-c, 78d-e, 78f-h. Each sub-block 78a-h comprises at least on resource element 32a, 32b or 32c, wherein between two resource elements of a specific block 76a, 76b or 76c at least one resource element of a different block is arranged. The use of distributed resource elements in a block allows for a wide spreading of the resource elements in the respective domain and thereby to obtain a varying influence of the channel, for example, a channel that attenuates some frequency differently from another frequency. Thus, the channels may be highly distinguishable. The blocks 76a, 76b and 76c may be predefined as well in the adjacent configuration and the distributed configuration. The resource selector 47 may be configured for selecting one or more blocks to be used for transmitting the signals. Each block may be regarded as a set of resource elements. The transmitter may be configured to obtain or receive a selection information indicating a subset of the plurality of predefined sets (blocks). For example, the selection information may indicate the blocks available in the wireless network. This may allow for excluding blocks being not supported or being reserved or the like. The transmitter is configured for selecting the one or more blocks from the indicated subset using the selection information.

The blocks 76a, 76b and 76c are illustrated in FIGS. 14a and 14b as being disjoint or distributed with respect to each other, i.e., there are no overlapping resource elements that are used in more than one block. I.e., the predefined set comprises resources being exclusively associated with the predefined set. Alternatively, one or more blocks may comprise at least one resource element overlapping with each other as described, for example, in connection with FIG. 4. An overlap may be at most 95%, at most 80% or at most 50%, wherein a higher amount of overlap allows for an efficient use of the media whilst at the same increasing the computational effort for separating the signals using overlapping blocks.

In other words, the resource block may consist of a known number of adjacent resources as illustrated in FIG. 14a. Alternatively, the resource block may comprise or may consist of a known number of resources, distributed over the predefined frequency band. The predefined frequency band may be indicated, for example, using the selection information. The location of each resource of a resource block may be known to transmitters and receivers by, e.g., predefined sets. Therefore, also the order of resources are known, e.g., by the order of the predefined set. IDS error codes are still working and deletion errors have the same restriction as described herein. Two additional advantages may be obtained due to distributed resources: first, the capabilities of estimating the channel metric are increased.

Second, for spectral observations, the channel is observed on different positions in the frequency band. Thus, the probability decreases that two channels are similar at the distributed positions.

Figure 15:
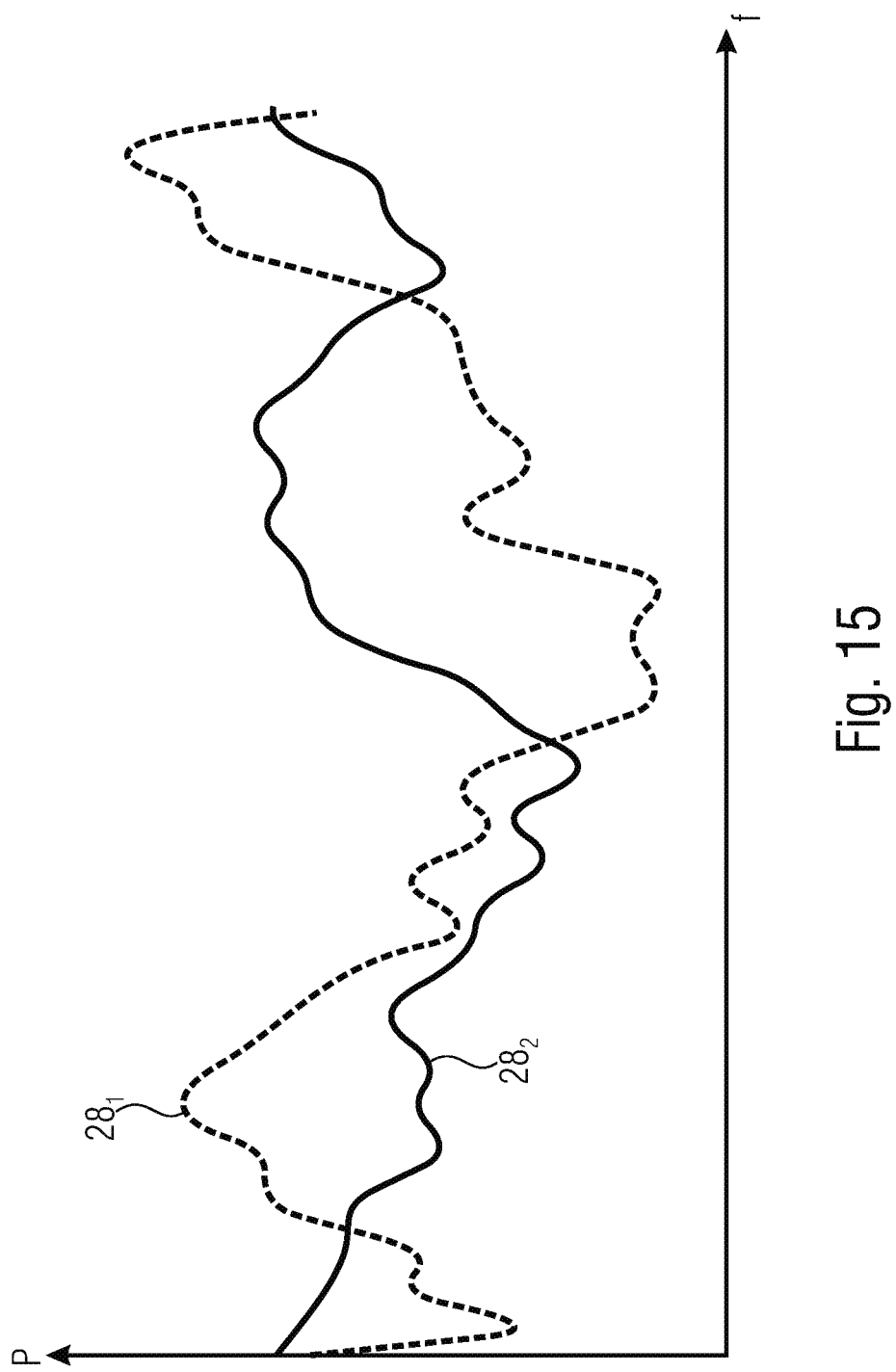
FIG. 15 shows an example of a power spectral density (PSD) of two randomly selected channels over a frequency band according to an embodiment.

Such a scenario is illustrated in FIG. 15 showing an example of power spectral density (PSD) of two randomly selected channels over the frequency band f. On the intersection of the two channels, the PSD of both channels is equal. However, for distributed resources, the quality of the accumulated PSD is unlikely. In conclusion, the estimation performance even further increases in comparison to adjacent resources.

I.e., instead of having full degree of freedom in selecting the resource map at each transmitter (within the limits of resource blocks), the permitted resource maps can be limited to predefined sets. The number of resources can differ in each set and/or block. With the introduction of predefined sets of blocks, the search space at the receiver is reduced and the performance of the resource map estimation is increased due to the reduced number of valid resource maps. In addition, a predefined set with many resources can even dramatically reduce the search complexity for the resource map, if the number of resources is sufficient to recover the channel by classical channel estimation approaches. There, only a combination of the predefined sets has to be checked if they belong together. I.e., not only a pattern of resource elements but also a pattern of blocks may be indicated by the selection information. The selection information may thus be information known to both the transmitter and the receiver. The selector information may also indicate a pattern of blocks. As described in connection with exclusive resources and non-exclusive resources, also the sets may be exclusive, i.e., each resource is exclusively assigned to a predefined set. Therefore, the resources only interfere if multiple transmitters select the same predefined set. Alternatively, when using overlapping sets, the resources are assigned to each set non-exclusively. Thus, each predefined set may overlap with other sets. The overlap increases the overall number of sets. In addition, the overlap between resource sets can be limited, such that introduced interference is resolvable by the applied error correction scheme. At the receiver, a respective information may be present. For example, the determiner of the receiver may be configured for determining the resource information using a predefined resource information indicating a plurality of resource blocks, each resource block having a unique predefined set of resource elements, wherein the determiner may be configured for determining the resource information by determining at least one resource block used for transmitting the signal from the plurality of resource blocks. As indicated for the resource elements within one block, the resource blocks being combined to form a set may also be distributed in the resource map.

A transmitter according to embodiments described herein may be configured for temporarily using a plurality of additional resources from a pool of additional resources in addition to the step of resources for transmitting the signal. When referring now to FIG. 16, there is shown a varying resource map $S_k$ over time t at time instances $t_0$, $t_1$, $t_2$ and $t_3$. For example, the different times may refer to different signals of different services or may represent the accumulated used bandwidth for transmitting all signals. A core set 82 may be used during each time step when transmitting a signal, for example, as described before in connection with blocks and sets of blocks. The core set 82 may comprise at least one resource 32. Alternatively, the core set 82 may comprise a higher number of at least 2, at least 3 or at least 4 resources, e.g., 5, 10 or more. In addition, there may be defined a pool of additional resources referred to as flexible resources 84. This may allow to temporarily increase bandwidth, e.g., for enhancing time critical communication.

According to an embodiment, the transmitter may be configured for temporarily using the plurality of additional resources 84 up to a predefined maximum data rate indicated by a maximum data rate information. The maximum data rate information may be provided, for example, by a base station and/or may be predefined. This may allow avoiding misuse and/or may allow a high a number of transmitters for using additional resources.

As well as the mapping which may be unknown at the receiver, the transmitter may be configured for temporarily using the plurality of additional resources 84 without signaling the use thereof to a receiver such as the receiver 30. Based on the core sets 82, the receiver may be able to determine the complete resource map.

The additional resources 84 may be single resource elements to be allocated individually by a number of one or more. Alternatively, the additional resources may also be blocks or sets of blocks to be occupied additionally, which further allows to reduce the search space, even when increasing the bandwidth. I.e., the resource selector of the transmitter may be configured to select at least one additional set of predefined sets for transmitting the signal.

Figure 16:
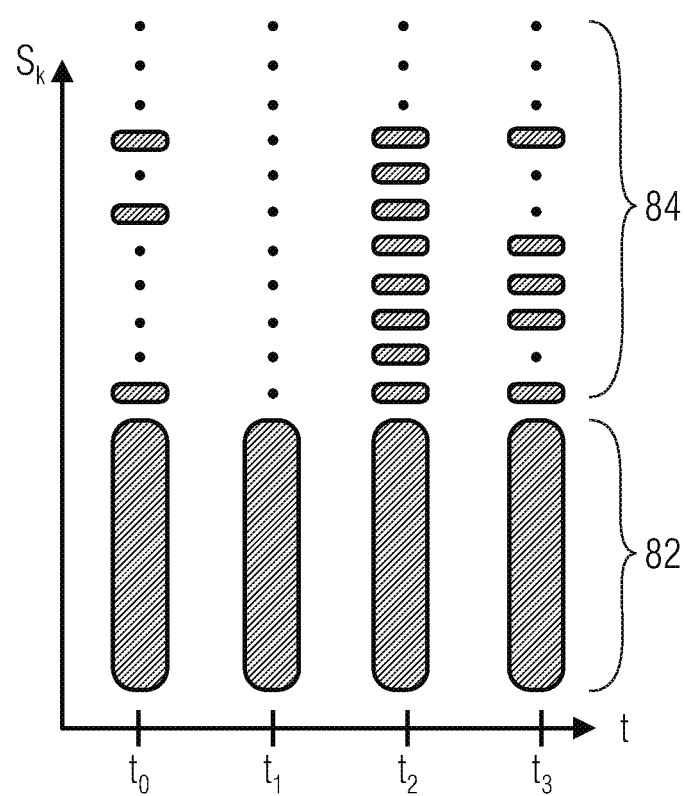
FIG. 16 shows a varying resource map over time according to an embodiment.

In other words, to support services with variable data rate, the concept of core sets is introduced. A communication link operating with variable data rate establishes a communication link to the fundament of a core set. In general, a core set can be seen as a fixed resource allocation set assigned to a single transmitter, consisting of, by example, only of minimum resources to establish a communication link. Additional resources may extend the core set to support higher data rates. In FIG. 16, a single core set is used for communication. At different time instances $t_n$ the core set is expanded by varying number of flexible resources. At time instance $t_1$, the minimum data rate is used with the selected core set. A maximum data rate is not necessary but may be implemented, for example, by defining it by the communication system. E.g., in FIG. 16 the maximum data rate is achieved at time instance $t_2$. In summary, the communication system can instantaneously adapt its data rate at each time instance $t_n$ up to a minimum data rate limited by the core set. The receiver identifies the extended resource map by solving equation 2. The position of the flexible resources can be arbitrary or can follow a certain assignment scheme. Instead of using only a single core set, a transmitter can also allocate multiple core sets at once. FIG. 16 only illustrates how core sets and flexible resources are working. The distribution of the resources within the core sets and the flexible resources can still be in the same manner as described herein, i.e., adjacent or distributed. In addition, the number of resources in each core set can differ as well. Examples for such services are video and audio streaming operating with variable data rates. There, in the most cases the used data rate is only at time of its generation. To support variable data rates, the classical communication system can reserve sufficient resources to handle the peak data rate or introduce delay to service to offload the data in time or to request more resources. The core sets may be selected by prior measurements of the channel metric. The resources with the best Key Performance Indicators (KPI) may be selected for the corresponding link (like best quality, best sum rate, etc.). Alternatively or in addition, Non-Orthogonal Multiple-Access (NOMA) schemes may be supported. There, different transmitters select the same resources with different levels in the corresponding channel power or a different dimension, such that interference cancellation techniques can be applied.

Core may comprise a number of at least one resource or resource block indicating, for example, by selection of the resources, the communication properties. For example, the core set 82 may allow for maintaining a basic communication or association between the devices, wherein for transmission of user data or payload, additional resources may be used by the transmitter. Such resources may be associated with the transmitter even when avoiding a prior signaling. According to an embodiment, According to an embodiment, a transmitter such as the transmitter 16, 16*a-d* is configured for wirelessly transmitting a signal to a receiver such as the receiver 30 or 30*a-e* and for using resource elements of a wireless communications network for said transmission. The transmitter is configured for using a core set 82 of resource elements as described in connection with FIG. 16 for transmitting a first signal during a first time instance. The transmitter is configured for using at least one additional resource from a pool of additional resources 84 in addition to the core set 82 for transmitting a second signal during a second instance of time without signaling the use of additional resources.

Although the embodiments described herein refer, by way of example, to an OFDM communication system, the proposed communication system may also be applicable for general multicarrier systems, where the resources are orthogonal on an arbitrary basis. General multicarrier systems are, for example, Filter Bank MultiCarrier (FBMC) and Generalized Frequency Division Multiplexing (GFDM). Embodiments described herein allow to communicate without prior knowledge of the resource map and the channel metric. Further, communication of multiple devices in a predefined spectrum (band) may be performed without access-grant procedure to obtain exclusive (managed) resource allocations. The ability is obtained to measure channel quality information without knowledge of the resource map. Embodiments may be used in the mobile communication, for example, in the Enhanced mobile broadband (eMBB) services, the device-to-device transmission and/or the low-latency communication. Embodiments allow for a communication without prior knowledge of the resource map and in addition, the channel can also be unknown to the receiver.

Networks according to embodiments may comprise a first transmitter such as transmitter $16_1$ configured for transmitting a first signal $28_1$ and a second transmitter such as transmitter $16_2$ configured for transmitting a second signal $28_2$ wherein the first and the second transmitter are configured to use predefined resources for transmitting the first and second signal $28_1$, $28_2$, wherein the predefined resources are predefined so as to indicate non-overlapping resources.

Networks according to embodiments may be configured such that the at least first transmitter $16_1$ is configured for selecting at least a first set from a plurality of predefined sets of resources for transmitting the signal 28. The at least first transmitter is configured for selecting the first set of resources from the plurality of predefined sets using a first selection information indicating a first subset of the plurality of predefined sets or blocks.

Networks according to embodiments may be configured such that the first transmitter $16_1$ is configured for selecting at least a first set from a plurality of predefined sets of resources for transmitting a signal $28_1$. A second transmitter $16_2$ is configured for selecting at least a second set from the plurality of predefined sets of resources for transmitting a second signal $28_2$. The first transmitter $16_1$ is configured for using a first channel metric $x_1$ indicating a first channel characteristic of at least a part of a first channel $h_1$ from the first transmitter $16_1$ to the receiver for selecting the at least first set dependent on the first channel characteristic. The second transmitter $16_2$ is configured for using a second channel metric $x_2$ indicating a second channel $h_2$ characteristic of at least a part of a second channel from the second transmitter $16_2$ to the receiver for selecting the at least second set dependent on the second channel characteristic.

Networks according to embodiments may be configures such that the first and second transmitter $16_1$, $16_2$ are configured for selecting same resources for transmission of the first signal $28_1$ and the second signal $28_2$, wherein the first and second transmitter $16_1$, $16_2$ are configured for applying a Non-Orthogonal Multiple Access Scheme for transmission of the first and second signal $28_1$, $28_2$.

Networks according to embodiments may be configured for operating according to a multicarrier concept comprising a plurality of carriers.

Although having been described partially in different embodiments, the aspects described herein, for example, of categorizing a UE, of blacklisting it, of controlling it so as to perform interference mitigation and/or to use a minimum transmission power below a predefined value may be combined with each other.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus.

Depending on certain implementation requirements, embodiments of the invention can be implemented in hardware or in software. The implementation can be performed using a digital storage medium, for example a floppy disk, a DVD, a CD, a ROM, a PROM, an EPROM, an EEPROM or a FLASH memory, having electronically readable control signals stored thereon, which cooperate (or are capable of cooperating) with a programmable computer system such that the respective method is performed.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods may be performed by any hardware apparatus.

While this invention has been described in terms of several embodiments, there are alterations, permutations, and equivalents which will be apparent to others skilled in the art and which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

REFERENCES

[1] Stefania Sesia, Matthew Baker, and Issam Toufik. LTE—The UMTS Long Term Evolution: From Theory to Practice. 2nd edition, John Wiley & Sons, 2011.
[2] Dennis Wieruch, Peter Jung, Thomas Wirth, and Armin Dekorsy. Identifying Non-Adjacent Multiuser Allocations by Joint 11-Minirnization. In Proc. of Wireless Communications and Networking Conference (WCNC), pp. 1-6, Doha, April 2016.
[3] Suhas Diggavi and Matthias Grossglauser. On Information Transmission over a Finite Buffer Channel. IEEE Transactions on Information. Theory, 52(3):1226-1237, 2006.
[4] H. Mercier, V. K Bhargava, and V. Tarokh. A survey of error-correcting codes for channels with symbol synchronization errors. IEEE Communications Surveys and Tutorials, 12(1), 87-96, 2010.
[5] D. Kracht, and S. Schober. Insertion and deletion correcting DNA barcodes based on watermarks. BMC Bioinformatics, 16(1), 50, 2015.
[6] Philipp Walk, Henning Becker, and Peter Jung. OFDM channel estimation via phase retrieval. In Proc. of 49th Asilomar Conference on Signals, Systems and Computers (pp. 1161-1168). 2015.
[7] Nshore Jaganathan and Yonina C. Eldar and Babak Hassibi. Phase Retrieval: An Overview of Recent Developments. On Computing Research Repository (CoRR) at arXiv.org, https://arxiv.org/abs/1510.07713, 2015.
[8] A. F. Molisch, "Ultrawideband Propagation Channels-Theory, Measurement, and Modeling", IEEE Transactions on Vehicular Technology, volume 54, no. 5, pp. 1528-1545, 2005

The invention claimed is:

1. A receiver that is configured for receiving a wireless signal comprising a signal transmitted through a channel using resource elements of a wireless communications network, the receiver comprising:
a determiner configured for determining, from the signal, a resource information indicating the resource elements used for transmitting the signal through the channel and for determining a channel metric of the channel; and
an associator configured for associating the resource information with the channel metric using an identity information comprised in the signal and that allows for identifying the transmitter of the signal, wherein:
the identity information comprises one of an identifier identifying the transmitter being a part of information transmitted in the signal, an identifier identifying the transmitter being indicated by a selection of the resource elements out of an overall set of resource elements and an identifier identifying the transmitter being indicated by the channel metric;
the identity information comprises one of an identifier being indicated by a selection of the resource elements out of an overall set of resource elements and an identifier being indicated by the channel metric;
the determiner is configured for determining the channel metric based on a predetermined rule according to which pilot symbols are mapped in the resources used by the signal using the pilot symbols comprised in the wireless signal;
the receiver further comprises an error corrector configured for correcting at least one bit error in the signal using the resource information; or
the determiner is configured for determining the resource information for a first and a second signal superimposing each other at least partially in the wireless signal by using at least one common resource element,
partially in the wireless signal by using at least one common resource element.

2. The receiver of claim 1,
wherein the wireless signal is a superposition of at least the signal being a first signal transmitted through the channel being a first channel using the resource elements of the wireless communications network as first resource elements and of a second signal transmitted through a second channel using second resource elements of the wireless communications network,
wherein the determiner is configured for determining the resource information as a first resource information and for determining a second resource information indicating the second resource elements and for determining the channel metric of the first channel as first metric and for determining a second channel metric of the second channel;
wherein the associator is configured for associating the first resource information with the first channel metric using the identity information as first identity information comprised in the first signal and for associating the second resource information with the second channel metric using second identity information comprised in the second signal.

3. The receiver of claim 1, further comprising a channel determiner configured for determining information related to a phase change and of an amplitude change of a first channel to a first signal and of a second channel to a second signal superimposing with the first signal in the wireless signal, wherein the receiver is configured to use the information related to the phase change and of the amplitude change for decoding the wireless signal.

4. The receiver of claim 1, wherein the determiner is configured for determining the resource information and the channel metric based on the determination rule $$(S, x) = \underset{S,x}{\mathrm{argmin}} \|x\|_{l1}$$

such that $$\|(S \cdot \Phi_K \cdot x) - y\|_{l2}^2 \leq \sigma^2$$

wherein S is a resource map of all K transmitters comprising the resource information, ($\Phi_K$ is a frequency conversion block matrix, where each block represents a Fourier matrix, x is the channel metric, y is the received frequency domain signal and $\sigma^2$ represents a permitted residual.

5. The receiver of claim 4, wherein the determiner is configured for determining the resource information as a plurality of resource values and to determine each of the plurality of resource values so as to comprise one of at least three values.

6. The receiver of claim 1, wherein the wireless signal is a superposition of at least the signal being a first signal and of a second signal being transmitted through a second channel using second resource elements, wherein the determiner is configured for determining the resource information as a first resource information and for determining a second resource information relating to the second resource elements based on a predetermined rule according to which pilot symbols and data symbols are mapped in the resources used by the first and second signal by separating the first signal from the second signal using information related to the predetermined rule.

7. The receiver of claim 1, wherein the determiner is configured for determining the resource information so as to comprise real values for data symbols and complex values for pilot symbols of the wireless signal based on the determination rule $$x_{k,d} = (h_k * s_{k,d})$$

wherein $$x = \begin{pmatrix} x_1 \\ \vdots \\ x_k \\ \vdots \\ x_K \end{pmatrix}$$

is the wireless signal being represented as $x_k \in \{x_{k,p}, x_{k,d}\}$, where the pilot signal $x_{k,p} = (h_k)$ is the $k^{th}$ channel and $x_{k,d}$ is the data signal being the convolution of the $k^{th}$ channel with the $k^{th}$ transmission signal, wherein y is the received frequency domain signal with a mix of complex values and mere amplitude values.

8. The receiver of claim 1, wherein the signal is a first signal of a plurality of signals in the wireless signal, wherein the determiner is configured for determining a resource information for each signal comprised in the wireless signal so as to acquire an overall resource information, wherein the determiner is configured for determining a channel metric for each channel associated to a signal in the wireless signal so as to acquire an overall channel metric.

9. The receiver of claim 1, wherein the determiner is configured for acquiring correction information indicating a result of the error correction and for adjusting a determination of the resource information dependent on the correction information.

10. The receiver of claim 1, wherein the error corrector is configured for implementing an error code for insertion, deletion and/or substitution.

11. The receiver of claim 1, wherein the determiner is configured for determining a resource information for each signal comprised in the wireless signal; the receiver further comprising:
  a decoder configured for decoding a first signal so as to acquire a first message transmitted with the first signal and for decoding a second signal so as to acquire a second message transmitted with the second signal;
  a channel determiner configured for determining information related to a phase change and an amplitude change of a first channel to the first signal and of a second channel to the second signal;
  an error corrector configured for correcting at least one bit error in the first signal using the resource information for the first signal or in the second signal using the resource information for the second signal.

12. The receiver of claim 1, wherein the determiner is configured for determining the resource information using a predefined resource information indicating a plurality of resource blocks, each resource block comprising a unique predefined set of resource elements, wherein the determiner is configured for determining the resource information by determining at least one resource block used for transmitting the signal from the plurality of resource blocks.

13. The receiver of claim 12, wherein resource elements are distributed in the at least one resource block, or wherein the resource blocks are distributed in the resource maps.

14. The receiver of claim 1, wherein the wireless signal comprises a first signal which is transmitted by a first transmitter and a second signal which is transmitted by a second transmitter being spatially separated from the first transmitter.

15. A wireless communications network providing a plurality of resource elements for transmitting signals, the network comprising:
  a receiver configured for receiving a wireless signal comprising a signal transmitted through a channel using resource elements of a wireless communications network, the receiver comprising:
    a determiner configured for determining a resource information indicating the resource elements and for determining a channel metric of the channel;
    an associator configured for associating the resource information with the channel metric using an identity information comprised in the signal; and
  at least a first transmitter configured for wirelessly transmitting to a receiver a signal using resource elements of a wireless communications network, and wherein the transmitter is configured for using a core set for transmitting a first signal during a first time instance, and wherein the transmitter is configured for using at least one additional resource from a pool of additional resources in addition to the core set for transmitting a second signal during a second instance of time without signaling the use of additional resources and wherein:
  the wireless communications network comprises the first transmitter configured for transmitting a first signal and a second transmitter, configured for transmitting a second signal, wherein the first and the second transmitter are configured to use predefined resources for transmitting the first and second signal, wherein the predefined resources are predefined so as to indicate non-overlapping resources;

the at least first transmitter is configured for selecting at least a first set from a plurality of predefined sets of resources for transmitting the signal, and wherein the at least first transmitter is configured for selecting the first set of resources from the plurality of predefined sets using a first selection information indicating a first subset of the plurality of predefined sets;

the first transmitter is configured for selecting at least a first set from a plurality of predefined sets of resources for transmitting a signal, and wherein a second transmitter is configured for selecting at least a second set from the plurality of predefined sets of resources for transmitting a second signal, and wherein the first transmitter is configured for using a first channel metric indicating a first channel characteristic of at least a part of a first channel from the first transmitter to the receiver for selecting the at least first set dependent on the first channel characteristic, and wherein wherein the second transmitter is configured for using a second channel metric indicating a second channel characteristic of at least a part of a second channel from the second transmitter to the receiver for selecting the at least second set dependent on the second channel characteristic; or wherein the first and second transmitter are configured for selecting same resources for transmission of the first signal and the second signal, wherein the first and second transmitter are configured for applying a Non-Orthogonal Multiple Access Scheme for transmission of the first and second signal.

16. The wireless network of claim 15, wherein the network is configured for operating according to a multicarrier concept comprising a plurality of carriers.

17. A method comprising:
receiving a wireless signal comprising a signal transmitted through a channel using resource elements of a wireless communications network;
determining, from the signal, a resource information indicating the resource elements used for transmitting the signal through the channel;
determining a channel metric of the channel; and
associating the resource information with the channel metric using an identity information comprised in the signal and that allows for identifying the transmitter of the signal, and
wherein:
the identity information comprises one of an identifier identifying the transmitter being a part of information transmitted in the signal, an identifier identifying the transmitter being indicated by a selection of the resource elements out of an overall set of resource elements and an identifier identifying the transmitter being indicated by the channel metric;
the identity information comprises one of an identifier being indicated by a selection of the resource elements out of an overall set of resource elements and an identifier being indicated by the channel metric;
the method comprises determining the channel metric based on a predetermined rule according to which pilot symbols are mapped in the resources used by the signal using the pilot symbols comprised in the wireless signal;
the method comprises correcting at least one bit error in the signal using the resource information; or
the method comprises determining the resource information for a first and a second signal superimposing each other at least partially in the wireless signal by using at least one common resource element.

18. A non-transitory digital storage medium having stored thereon a computer program for performing a method that comprises:
receiving a wireless signal comprising a signal transmitted through a channel using resource elements of a wireless communications network:
determining, from the signal, a resource information indicating the resource elements used for transmitting the signal through the channel;
determining a channel metric of the channel; and
associating the resource information with the channel metric using an identity information comprised in the signal and that allows for identifying the transmitter of the signal,
and wherein:
the identity information comprises one of an identifier identifying the transmitter being a part of information transmitted in the signal, an identifier identifying the transmitter being indicated by a selection of the resource elements out of an overall set of resource elements and an identifier identifying the transmitter being indicated by the channel metric;
the identity information comprises one of an identifier being indicated by a selection of the resource elements out of an overall set of resource elements and an identifier being indicated by the channel metric;
the method comprises determining the channel metric based on a predetermined rule according to which pilot symbols are mapped in the resources used by the signal using the pilot symbols comprised in the wireless signal;
the method comprises correcting at least one bit error in the signal using the resource information; or
the method comprises determining the resource information for a first and a second signal superimposing each other at least partially in the wireless signal by using at least one common resource element.

* * * * *

UNITED STATES PATENT AND TRADEMARK OFFICE
CERTIFICATE OF CORRECTION

| | |
|---|---|
| PATENT NO. | : 11,785,628 B2 |
| APPLICATION NO. | : 16/838777 |
| DATED | : October 10, 2023 |
| INVENTOR(S) | : Dennis Wieruch, Peter Jung and Bernd Holfeld |

It is certified that error appears in the above-identified patent and that said Letters Patent is hereby corrected as shown below:

In the Claims

In Claim 4, Column 33, Line 13, delete "information, ($\Phi_K$ is a frequency" and insert -- information, $\Phi_K$ is a frequency --

Signed and Sealed this
Thirtieth Day of July, 2024

Katherine Kelly Vidal
*Director of the United States Patent and Trademark Office*